(12) United States Patent
Mendez et al.

(10) Patent No.: US 10,827,011 B2
(45) Date of Patent: Nov. 3, 2020

(54) PRESENCE ENHANCED CO-BROWSING CUSTOMER SUPPORT

(71) Applicant: Glance Networks, Inc., Arlington, MA (US)

(72) Inventors: Deborah Mendez, Arlington, MA (US); Edward F. Hardebeck, Brookline, MA (US); Richard L. Baker, Belmont, MA (US)

(73) Assignee: Glance Networks, Inc., Wakefield, MA (US)

( * ) Notice: Subject to any disclaimer, the term of this patent is extended or adjusted under 35 U.S.C. 154(b) by 583 days.

(21) Appl. No.: 15/270,258

(22) Filed: Sep. 20, 2016

(65) Prior Publication Data

US 2017/0013073 A1   Jan. 12, 2017

Related U.S. Application Data

(63) Continuation-in-part of application No. 14/598,743, filed on Jan. 16, 2015, now Pat. No. 9,736,213, which is a continuation of application No. PCT/US2013/049615, filed on Jul. 8, 2013.

(Continued)

(51) Int. Cl.
| | |
|---|---|
| *H04L 29/08* | (2006.01) |
| *G06Q 30/00* | (2012.01) |
| *G06F 9/455* | (2018.01) |
| *H04L 12/18* | (2006.01) |
| *G06F 3/0482* | (2013.01) |

(Continued)

(52) U.S. Cl.
CPC ............ *H04L 67/22* (2013.01); *G06F 3/0482* (2013.01); *G06F 9/45512* (2013.01); *G06F 16/954* (2019.01); *G06Q 30/016* (2013.01); *H04L 12/1822* (2013.01); *H04L 67/02* (2013.01);

(Continued)

(58) Field of Classification Search
CPC ............ G06F 17/30873; G06F 3/0482; G06F 9/45512; H04L 12/1822; H04L 51/043; H04L 65/403; H04L 67/02; H04L 67/141; H04L 67/22; H04L 67/24
See application file for complete search history.

(56) References Cited

U.S. PATENT DOCUMENTS

| | | | |
|---|---|---|---|
| 7,673,340 B1 * | 3/2010 | Cohen ................. | G06F 11/3438 379/266.08 |
| 8,200,527 B1 * | 6/2012 | Thompson ......... | G06Q 10/0639 705/7.38 |

(Continued)

*Primary Examiner* — Joe Chacko
(74) *Attorney, Agent, or Firm* — Anderson Gorecki LLP

(57) ABSTRACT

Script on a visitor's browser posts information about the visitor to a presence system. The script may post information such as the URL of the page being viewed by the visitor and any available information identifying the visitor. Agents connect to the presence system to detect visitors on the website. Any identifying information posted by the visitors to the presence system is captured into the agent CRM system to enable the agents to see, within the CRM system, which contacts known to the CRM system are currently on the website. The agent may signal the visitor through the presence system to initiate a co-browse session on which the agent can see the visitor's activities on the website. The co-browse session may be initiated by the agent without requiring the visitor to take action and optionally without the visitor's knowledge.

42 Claims, 11 Drawing Sheets

Related U.S. Application Data

(60) Provisional application No. 61/776,016, filed on Mar. 11, 2013, provisional application No. 61/673,629, filed on Jul. 19, 2012.

(51) Int. Cl.
  *G06F 16/954* (2019.01)
  *H04L 12/58* (2006.01)

(52) U.S. Cl.
  CPC ............ *H04L 67/141* (2013.01); *H04L 67/24* (2013.01); *H04L 51/043* (2013.01)

(56) References Cited

U.S. PATENT DOCUMENTS

| | | | | |
|---|---|---|---|---|
| 2002/0055973 A1* | 5/2002 | Low | ................ | G06Q 30/06 709/204 |
| 2002/0101853 A1* | 8/2002 | Siegrist | ............... | H04M 3/5191 370/352 |
| 2003/0097448 A1* | 5/2003 | Menezes | ................ | H04L 29/06 709/227 |
| 2008/0052377 A1* | 2/2008 | Light | ................... | G06Q 10/107 709/218 |
| 2012/0069131 A1* | 3/2012 | Abelow | ............... | G06Q 10/067 348/14.01 |
| 2013/0055113 A1* | 2/2013 | Chazin | ................ | H04L 12/1822 715/758 |
| 2013/0138765 A1* | 5/2013 | Fielding | ................. | H04L 63/10 709/217 |
| 2013/0268357 A1* | 10/2013 | Heath | .................... | H04L 63/00 705/14.53 |
| 2013/0282417 A1* | 10/2013 | Gaedcke | ............. | G06Q 30/016 705/7.13 |
| 2014/0126708 A1* | 5/2014 | Sayko | ................... | H04M 11/00 379/93.01 |
| 2018/0032997 A1* | 2/2018 | Gordon | ............. | G06Q 20/3224 |

\* cited by examiner

FIG. 4

Customer Relationship Management System 36

| Contact (411) | Phone (412) | Account Name (413) | Most recent conversation (414) | Annual Sales (416) | Status (418) |
|---|---|---|---|---|---|
| J. Fox | 123-456-7890 | Rocket | 6/12/2016 | $25,000 | Co-Browse |
| M. Goose | 234-567-8901 | Rhymes Inc. | 8/25/2016 | $21,000 | Co-Browse |
| C. Little | 345-678-9012 | SkyFall | 5/4/2016 | $12,000 | Co-Browse (420) |
| R. Hood | 456-789-0123 | ForestWays | 7/1/2016 | $2,000 | Co-Browse |
| C. Brown | 567-890-1234 | Peanut Emporium | 8/9/2016 | $45,000 | Co-Browse |
| S. Noopy | 678-901-2345 | Barron | 1/18/2016 | $15,000 | Co-Browse (420) |
| L. van Pelt | 789-012-3456 | Football Tee Co. | 3/6/2016 | $3,000 | Co-Browse |
| W. Wonka | 890-123-4567 | CoCo Co. | | $1,000 | Co-Browse |
| D. Me | 901-234-5678 | Minion LLP | | $500 | Co-Browse |
| B.B. Wolf | 888-xxx-yyyy | HuffPuff Inc. | | $23,000 | |

Customer Relationship Management System 36

| Contact | Phone | Account Name | | | Status |
|---|---|---|---|---|---|
| J. Fox | 123-456-7890 | Rocket | | | Co-Browse |
| M. Goose | 234-567-8901 | Rhymes Inc. | | | Co-Browse |
| C. Little | 345-678-9012 | SkyFall | | | Co-Browse |
| R. Hood | 456-789-0123 | ForestWays | | $2,000 | Co-Browse |
| C. Brown | 567-890-1234 | Peanut Emporium | 5/4/2016 | $45,000 | Co-Browse |
| S. Noopy | 678-901-2345 | Barron | 7/1/2016 | $15,000 | Co-Browse |
| L. van Pelt | 789-012-3456 | Football Tee Co. | 8/9/2016 | $3,000 | Co-Browse |
| W. Wonka | 890-123-4567 | CoCo Co. | 1/18/2016 | $1,000 | Co-Browse |
| D. Me | 901-234-5678 | Minion LLP | | $500 | Co-Browse |
| B.B. Wolf | 888-xxx-yyyy | HuffPuff Inc. | 3/6/2016 | $23,000 | Co-Browse |

Most recent

| Location | Duration | Date |
|---|---|---|
| 1.ws.com | 4 min | 8/25/2016 |
| 2.ws.com | 2 min | 8/25/2016 |
| 3.ws.com | 3 min | 8/25/2016 |
| 4.ws.com | 30 sec | 7/24/2016 |

FIG. 9

Customer Relationship Management System 36

| Contact | Phone | | | Status |
|---|---|---|---|---|
| J. Fox | 123-456-7890 | | | Co-Browse |
| M. Goose | 234-567-8901 | | | Co-Browse |
| C. Little | 345-678-9012 | | | Co-Browse |
| R. Hood | 456-789-0123 | Rhymes Inc. | 5/4/2016 $2,000 | Co-Browse |
| C. Brown | 567-890-1234 | SkyFall | 7/1/2016 $45,000 | Co-Browse |
| S. Noopy | 678-901-2345 | ForestWays | 8/9/2016 $15,000 | Co-Browse |
| L. van Pelt | 789-012-3456 | Peanut Emporium | 1/18/2016 $3,000 | Co-Browse |
| W. Wonka | 890-123-4567 | Barron | $1,000 | Co-Browse |
| D. Me | 901-234-5678 | Football Tee Co. | $500 | Co-Browse |
| B.B. Wolf | 888-xxx-yyyy | CoCo Co. | 3/6/2016 $23,000 | Co-Browse |
|  |  | Minion LLP |  |  |
|  |  | HuffPuff Inc. |  |  |

Most recent
| Location | Duration | Date |
|---|---|---|
| 1.ws.com | 4 min | 8/25/2016 |
| 2.ws.com | 2 min | 8/25/2016 |
| 3.ws.com | 3 min | 8/25/2016 |
| 4.ws.com | 30 sec | 7/24/2016 |

Chair $400 [Add to Cart] — 440

FIG. 10

Customer Relationship Management System 36

| Contact | Phone | Account | Most recent | | | Status |
|---|---|---|---|---|---|---|
| | | | Location | Duration | Date | |
| J. Fox | 123-456-7890 | | .ws.com | 4 min | 8/25/2016 | Co-Browse |
| M. Goose | 234-567-8901 | | .ws.com | 2 min | 8/25/2016 | Co-Browse |
| C. Little | 345-678-9012 | Paper $40 [Add to Cart] | .ws.com | 3 min | 8/25/2016 | Co-Browse |
| R. Hood | 456-789-0123 | SkyFall | 4.ws.com | 30 sec | 7/24/2016 | Co-Browse |
| C. Brown | 567-890-1234 | ForestWays | | | 5/4/2016 | Co-Browse |
| S. Noopy | 678-901-2345 | Peanut Emporium | | | 7/1/2016 | Co-Browse |
| L. van Pelt | 789-012-3456 | Barron | | | 8/9/2016 | Co-Browse |
| W. Wonka | 890-123-4567 | Football Tee Co. | | | 1/18/2016 | Co-Browse |
| D. Me | 901-234-5678 | CoCo Co. | | | | Co-Browse |
| B.B. Wolf | 888-xxx-yyyy | Minion LLP | | | 3/6/2016 | Co-Browse |
| | | HuffPuff Inc. | | | | |

$2,000
$45,000
$15,000
$3,000
$1,000
$500
$23,000

PRESENCE ENHANCED CO-BROWSING CUSTOMER SUPPORT

CROSS REFERENCE TO RELATED APPLICATIONS

This application is a Continuation In Part of U.S. patent application Ser. No. 14/598,743, filed Jan. 16, 2015, entitled Integrating Co-Browsing with Other Forms of Information Sharing, which is a Continuation of International Application PCT/US2013/049615, which claims priority to U.S. Provisional Patent Application No. 61/776,016, filed Mar. 11, 2013, and U.S. Provisional Patent Application No. 61/673,629, filed Jul. 19, 2012, the content of each of which is hereby incorporated herein by reference.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

FIELD

The field relates to communication sessions and, more particularly, to presence enhanced co-browsing customer support.

BACKGROUND

Companies rely on web sites for sales and other interaction with customers. If a customer is having trouble making a purchase or completing a transaction on the website, the customer may give up in frustration thus causing the website owner to lose business from the customer. Accordingly, websites frequently provide an option for users to interact with a customer agent or other live person to obtain additional information not provided on the website and to otherwise provide assistance to people on the website. Typically website assistance may be provided via chat or voice telephone call.

Agents providing website assistance to website users are often tasked with helping a large number of people, depending on the volume of website visitors seeking assistance and the number of available agents. Accordingly, reducing the amount of time an agent takes to assist a person is desirable, since doing so enables the agent to assist a larger number of people to reduce the possibility that a person requiring assistance is unable to obtain access to an agent.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

All examples and features mentioned below can be combined in any technically possible way.

In one implementation, presence information of visitors to a website is collected and posted to a presence system. Agents connect to the presence system to detect visitors on the website. Any identifying information posted by the visitors to the presence system is captured into the agent CRM system to enable the agents to see, within the CRM system, which visitors are on the website. Co-browse sessions on which the Agent can see the visitor's activities on the website are automatically able to be launched without requiring the visitor to take action. The co-browse sessions may be independent of any other contact between the agent and visitor or may be associated with communication between the agent and visitor such as in connection with a phone call. Enabling the agent to see what the visitor is doing on the website, and to see the visitors' view of the website, reduces the amount of time it takes the agent to provide assistance to the visitor and provides the agent with intelligence when seeking to initiate communication sessions with contacts in the CRM system.

In one aspect, a method of presence enhanced co-browsing customer support is provided. The method includes receiving information about a visitor to a website by an agent system from a presence system, and instructing the presence system to signal a visitor web browser associated with the visitor to cause the visitor web browser to initiate contact with a co-browse system to establish a co-browse session on which the visitor web browser's current live view of the website is viewable at the agent system.

In some implementations, the step of instructing the presence system to signal the visitor web browser is performed by the presence system in response to input from the agent system.

In certain implementations the method further includes using the information from the presence system, by the agent system, to identify the visitor in a Customer Relationship Management (CRM) software system.

In some implementations, the step of instructing the presence system to signal the visitor web browser is performed by the presence system in response to input from the CRM software system.

In certain implementations the method further includes the step of initiating a communication session between the agent and the visitor by the agent system in connection with the step of instructing the presence system to signal the visitor web browser.

In some implementations, the communication session is a voice telephone call, a video telephone call, a communication session based on Voice Over Internet Protocol (VOIP), or a request for an interactive text or SMS based chat session.

In certain implementations the method further includes receiving, by the agent system, a request to participate in a communication session from the visitor; and accepting, by the agent system, the request to participate in the communication session. The step of instructing the presence system to signal the visitor web browser is performed in connection with the step of accepting the request to participate in the communication session.

In some implementations, the communication session is a voice telephone call, a video telephone call, a communication session based on Voice Over Internet Protocol (VOIP), or a request for an interactive text or SMS based chat session.

In certain implementations, the method further includes further comprising the step of displaying a dialog to the visitor via the visitor's web browser to request permission from the visitor in connection with the step of signaling the visitor web browser and prior to causing the visitor web browser to initiate contact with the co-browse system.

In some implementations, the method further includes the step of displaying a dialog to the visitor via the visitor's web browser to request permission from the visitor in connection with the step of signaling the visitor web browser, the dialog being downloaded from the co-browse system when the visitor web browser initiates contact with the co-browse system.

In certain implementations, the step of signaling does not provide an indication in the visitor web browser that the display of the visitor's current live view of the website will be viewable at the agent system.

In some implementations, the website is scripted with co-browse script configured to enable the co-browse session to be started by the visitor web browser without action by the visitor.

In certain implementations, the website is scripted with presence script configured to cause the visitor's web browser to forward the information about the visitor to the presence system.

In some implementations, the information about the visitor includes information to enable the presence system to uniquely identify the visitor In certain implementations, the information about the visitor further includes a URL of a webpage on the website that the visitor is browsing.

In some implementations, the information about the visitor further includes a value of a shopping cart on the website associated with the visitor.

In certain implementations, the information about the visitor further includes browsing history of webpages on the website that the visitor has previously browsed.

In some implementations, the method further includes downloading script by the visitor, the script containing first instructions to post presence information about the visitor to the presence system and containing second instructions to post DOM information of the visitor browser to enable the visitor's current live view of the website to be recreated at the remote location.

In certain implementations, the step of signaling causes the second instructions to start posting DOM updates to a co-browse system without providing an indication to the visitor on the web browser's user interface that the visitor's current live view of the website is able to be recreated at the remote location.

In some implementations, the step of signaling causes a permission dialog to be presented to the visitor before the second instructions start posting DOM updates to a co-browse system to require the visitor to consent to having the visitor's current live view of the website recreated at the remote location.

In certain implementations, the information entered by the visitor into the website is information about the user that is obtained from a first party cookie stored by the browser containing information about the user gleaned from previous interactions between the visitor and the website.

In another aspect, a method of presence enhanced co-browsing customer support is provided. The method includes receiving information about a plurality of visitors currently viewing a website from a presence system, using the information from the presence system to identify a subset of the visitors currently viewing the website that are known, displaying the identified subset of the known visitors, and signaling, via the presence system, a selected one of the visitors to cause a web browser of the selected one of the visitors to initiate a co-browse session on which the selected visitor's web browser's current live view of the website is viewable at a remote location.

In certain implementations, the step of using the information from the presence system comprises providing the information from the presence system to a Customer Relationship Management (CRM) software system, and using the CRM software system to identify the subset of known visitors, wherein the subset of known visitors comprise visitors to the website that are recognized by the CRM software system.

In some implementations, the step of displaying comprises displaying a list of CRM entries associated with visitors known in the CRM software system that are currently viewing the website.

In certain implementations, the step of displaying comprises highlighting CRM entries associated with visitors known in the CRM software system that are currently viewing the website.

In some implementations the method further includes displaying indications of content of webpages on the website that the visitors are currently viewing.

In certain implementations, the step of displaying indications is performed by hovering over the indications of the visitors known in the CRM software system via a user interface of the CRM software system.

In some implementations the method further includes displaying a list of previous web pages that one of the visitors, who is known in the CRM software system and currently viewing the website, has previously viewed.

In certain implementations the method further includes displaying indications of content of webpages on the website that the visitors are currently viewing.

In some implementations, the step of signaling only occurs upon interaction with one of the displayed indications.

In certain implementations, the step of displaying indications is performed by hovering over the indications of the visitors.

In some implementations, the indications of content of webpages is a list of URLs of the webpages.

In certain implementations, the indications of content of webpages show current live views of the webpages obtained from co-browse sessions with the visitors.

In some implementations the method further includes displaying a list of previous web pages that one of the visitors, who is currently viewing the website, has previously viewed.

In certain implementations, the list of previous web pages is a list of URLs, list of page titles, list of product information contained on the previous web pages, or images of the previous web pages.

In some implementations, the step of signaling occurs for each of the identified subset of users, the method further comprising the step of displaying the current live view of the webpage of each of the identified subset of visitors by hovering over a URL of the current webpage in the list of URLs to enable the visitor's current live view of the website to be viewed at a remote location.

In certain implementations the method further includes the step of displaying a dialog, in connection with the step of signaling, to request permission from the visitor prior to causing the selected one of the visitors to initiate the co-browse session on which the selected one of the visitor's current live view of the website will be viewable at the remote location.

In some implementations the method further includes the step of displaying a dialog to the visitor via the visitor's web browser to request permission from the visitor in connection with the step of signaling the visitor web browser, the dialog being downloaded from the co-browse system when the visitor web browser initiates contact with the co-browse system.

In certain implementations, the step of signaling does not provide an indication on the selected visitor's web browser's user interface that the visitor's current live view of the website will be viewable at the remote location.

In some implementations, the remote location is web browser of a customer support agent for the website.

In certain implementations, the method further includes receiving information about a plurality of agents currently supporting a website by a presence system, and using the information, by the presence system, to notify a second subset of visitors currently viewing the website that are assigned to a particular agent when the particular agent is available to engage the visitors.

In another aspect, a method of recreating content of a first browser at a second location is provided. The method includes downloading co-browse script and presence script from a website to the first browser, forwarding, by the presence script, presence information identifying the first browser to a presence system, receiving a signal from the presence system, by the presence script, to initiate a co-browse session, and in response to receiving the signal, initiating a co-browse session, by the co-browse script on the first browser, the co-browse script being configured to capture HTML changes to the content of the first browser and forward the HTML changes via a co-browse service to the second browser, to enable the content of the first browser to be recreated at the second browser.

In another aspect, a method of using a presence system is provided. The method includes receiving, by a presence system, presence updates from visitors to a website identifying the visitors to the website, receiving, by the presence system, a query from an agent about visitors on the website, responding, by the presence system, to the query with identification information about the visitors to the website, receiving a request, by the presence from the agent, to signal a selected identified visitor, and signaling, by the presence system to the selected identified visitor, to cause the selected identified visitor to initiate a co-browse session via a co-browse system on which the visitor's DOM is periodically transmitted to the agent to enable the visitor's live view of the website to be recreated by the agent.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIGS. 4-7 are screen illustrations of an agent view of customer relationship management software when integrated with presence enhanced co-browsing customer support;

FIGS. 8-10 are screen illustrations of an agent view of customer relationship management software when integrated with presence enhanced co-browsing customer support according to another implementation.

DETAILED DESCRIPTION

The following detailed description sets forth numerous specific details to provide a thorough understanding of one or more embodiments of the invention. However, those skilled in the art will appreciate that the invention may be practiced without these specific details. In other instances, well-known methods, procedures, components, protocols, algorithms, and circuits have not been described in detail so as not to obscure the invention.

Co-Browse Overview

Figure 1:
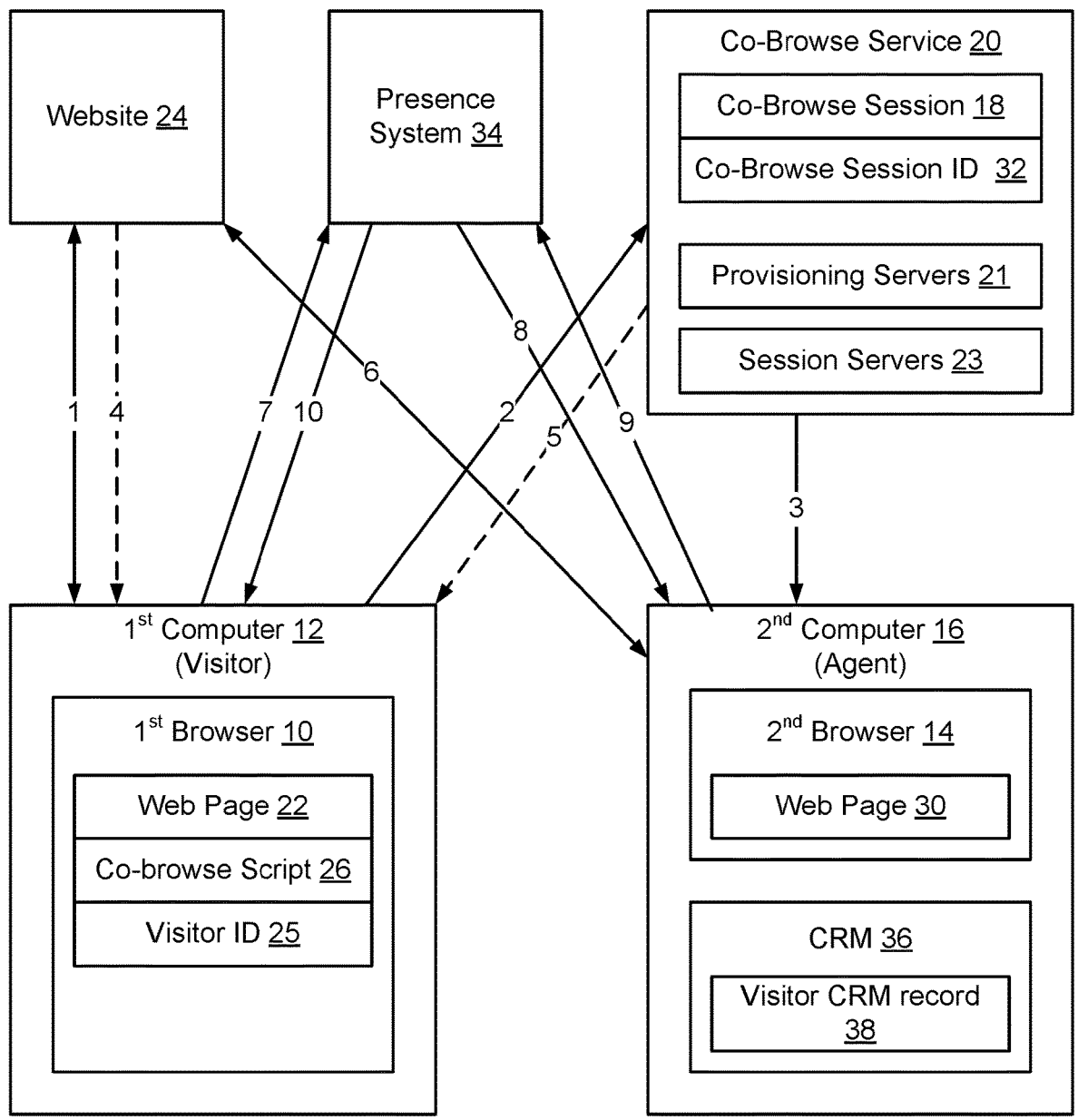
FIG. 1 is a functional block diagram illustrating the flow of information between participants in a presence enhanced co-browsing customer support system.

FIG. 1 shows a network diagram of a presence enhanced co-browsing customer support system in which the content of a first browser 10 on a first computer 12 is visible in a second browser 14 on a second computer 16. Co-browsing takes place in a co-browse session 18 hosted by a co-browse service 20. The co-browse session 18 involves the exchange of information from the first browser 10 to the second browser 14 as discussed in greater detail herein.

In one use-case scenario, the first browser is a visitor to a website 24 and the second browser is an agent associated with the website to provide technical or sales customer support. In the description set forth below, the term "visitor" is used to refer to the first browser 10 on first computer 12 that has downloaded a webpage from website 24. The term "agent" is used to refer to the second browser 14 on second computer 16 that would like to co-browse with the visitor to be able to see what the visitor is seeing on the webpage.

Depending on the implementation, co-browse service 20 may be implemented as one or more servers 21, 23, configured to establish and handle co-browse sessions. In an embodiment, as shown in FIG. 1, the co-browse service 20 is implemented as one or more provisioning servers 21 to handle signaling in connection with allowing users to establish and join co-browse sessions 18. In this embodiment, the co-browse service 20 further includes one or more session servers 23 to handle transmission of data between participants on active co-browse sessions 18. Participants to a co-browse session, such as the visitor and agent, participate in an exchange with the provisioning server 21 to cause a co-browse session to be established, and data that is passed between the participants to the co-browse session 18 is communicated through one of the session servers 23 assigned by the provisioning server 21 to handle data traffic on the co-browse session. In other implementations, both signaling and session functions may be handled by the same server. For convenience, the term "co-browse service" is used herein to refer to a collection of servers on the network configured to handle the signaling and session functions associated with establishing co-browse sessions and handling the transmission of data between co-browse session participants.

In the embodiment shown in FIG. 1, the first browser 10 loads a web page 22 from a website 24. Arrow 1 shows the download of the web page 22 from the website 24 to the first browser 10. The co-browse service 20 facilitates the co-browse session 18 by relaying web page updates (arrow 2) from the first browser 10 to the second browser 14 (arrow 3). To cause the first browser 10 to provide these updates, co-browse script 26 (JavaScript in one embodiment) is downloaded to the first browser 10 either from the website 24 (arrow 4) or from the co-browse service 20 (arrow 5).

Although an embodiment will be described in which co-browse script 26 is described as being implemented using JavaScript, other forms of scripting language may be utilized as well. For example, JavaScript is an implementation of a scripting language standard by ECMA International in the ECMA-262 specification. Other implementations of this standard include JScript and ActionScript. Thus, although an implementation will be described in which JavaScript is used, the invention is not limited to this particular implementation as other forms of script may be used as well.

A list of masked elements may also be downloaded from the website 24 or from the co-browse service. The list of masked elements identifies aspects of the website 24 that should be masked to not be visible to agents during a co-browse session.

In one implementation, updates (arrow 2) reflect changes in the Document Object Model (DOM) of the first browser 10. These updates are described using HTML. The co-browse service 20 downloads HTML updates to the second browser 14 (arrow 3). The second browser 14 renders web page 30 that appears identical to webpage 22 from website 24 (arrow 6) using the HTML updates provided by the first browser 10 on the co-browse session 18. In an implementation, the HTML associated with the web page 30 is downloaded from the co-browse service 20 (arrow 3). The HTML may contain references to style sheets, images, fonts, etc., on the website 24 and elsewhere on the Internet. The second browser 14 uses these URLs to obtain content to be displayed in web page 30 from the website 24 (arrow 6) and possibly resources from other websites or content delivery networks on the Internet. Since the HTML of the web page 30 is provided to the second browser 14 from the first browser 10 on co-browse session 18, the web page 30 displayed by the second browser will appear to be identical to web page 22 displayed on the first browser 10.

The presence enhanced co-browse customer support system enables the web page 30 displayed by the second browser 14 of the agent to appear to be identical to the web page 22 that is displayed on the first browser 10 of the visitor. Since the co-browsing session relies only on co-browse script 26 that is downloaded during the web browsing session, the visitor is not required to have any previously installed software and does not need to manually install software or plug-ins to participate in the co-browse session. Likewise, no security warning dialogs are required to be approved by the visitor in order for the agent to view a web page that appears to be identical to the one being viewed by the visitor. Additional details relating to an implementation of co-browsing is described in U.S. Patent Application Publication No. 2015/0149557, filed Jan. 16, 2015, entitled Integrating Co-Browsing With Other Forms Of Communication Sharing, the content of which is hereby incorporated herein by reference.

In addition to allowing the agent to see the same webpage as the visitor, in some implementations, input from the agent to the webpage 30 being viewed by the agent is captured by the co-browse service 20 and used to enable the agent to control operation of the first browser 10. Specifically, in this implementation, key presses and mouse clicks by the agent are captured on the second computer and used to control the first browser 10 on the first computer 12 to enable the agent to control the first browser. Optionally the visitor may be prompted via a dialog or other user control prior to or in connection with granting of control of the first browser 10 to the agent. When the agent has control over the visitor's browser 10, the agent may click, type, or provide other input that will appear within the browser 10 to enable the agent to guide the visitor through the website 24. Likewise the agent may push a URL to another scripted website to the first browser 10, to enable the agent to navigate the first browser 10 for the visitor to other websites/domains while co-browsing with the visitor. In an implementation the visitor is provided with a user interface control to regain control over the first browser 10 to enable the visitor to discontinue authorization of remote control by the agent.

According to an embodiment, as shown in FIG. 1, a presence system 34 is used to maintain information about visitors to website 24. The presence system receives updates from visitors 12 (arrow 7) and provides information about the visitors to second computer 16 (arrow 8). The presence server also receives signals from the agent (arrow 9) and relays these signals to the visitor (arrow 10) to enable the agent to control the co-browsing experience of that visitor, such as to cause the visitor's browser 10 to automatically initiate a co-browsing session 18 so the agent can see what the visitor is viewing on the website.

Although the arrows in FIG. 1 are numbered 1 through 10, the numbering of the arrows is not intended to imply a chronological sequence. Rather, the various transmissions may take place in many different orders. For example, in connection with downloading the website (arrow 1) the visitor may concurrently download the script (arrow 4). The visitor may then post presence information to the presence server (arrow 7) which is then provided to agent (arrow 8). In response, the agent may signal the visitor (arrows 9 and 10) to start a co-browse session (arrows 2 and 3). Thus, the particular sequence in which the information is exchanged between the components of the system may vary depending on the particular way in which the participants interact with the system.

In an implementation, information from the presence system 34 is used by the agent to integrate with a customer relationship management client 36 to enable the second computer 16 to correlate presence of visitors 12 on the website 24 with associated visitor CRM records 38 accessed by the agent. Additional information about integrating co-browse sessions with customer relationship management is described in U.S. Patent Application Publication No. 2015/0149557, filed Jan. 16, 2015, entitled Integrating Co-Browsing With Other Forms Of Communication Sharing, the content of which is hereby incorporated herein by reference.

Figure 2:
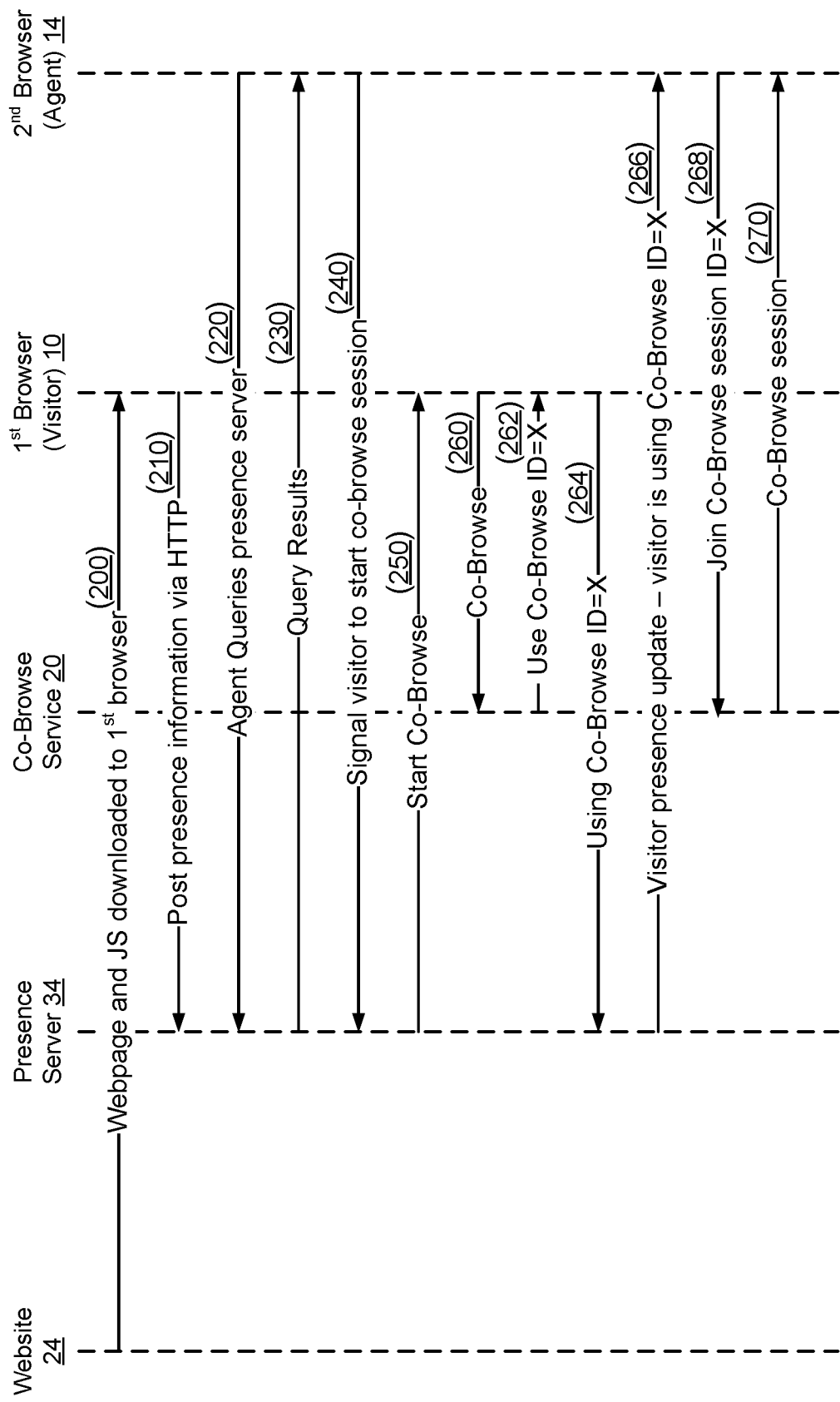
FIGS. 2 and 3 are lane diagrams showing several examples of how information may be exchanged between participants in a presence enhanced co-browsing customer support system.

FIG. 2 is a lane diagram illustrating one example of the flow of information between participants of a presence enhanced co-browsing customer support system such as the system of FIG. 1. As shown in FIG. 2, when visitor directs first browser 10 to website 24, webpage 22 and JavaScript 26 will be downloaded to the first browser 10 (arrow 200). The manner in which a browser behaves in connection with downloading a webpage from a website is well known and, accordingly, will not be described in detail herein.

Once the webpage has been loaded, co-browse script 26 will post presence information about the visitor to the presence server 34 (arrow 210). In an implementation, the presence information is posted via a protocol supported by standard web browsers, such as HTTP, HTTPS, or websockets. For example, the visitor may post presence information to the presence service via http and open a websocket connection to the presence server so that it can be notified as soon as an agent wants to start a co-browse session. Script 26 will periodically post presence information to the presence server 34 as long as first browser 10 has a webpage 22 loaded from website 24 that is supported by presence server 34.

In one embodiment the web page that the visitor is visiting will have some sort of unique ID for the visitor, which the website will assign to the user based on any available data the website has about the user. For example, the user may enter data into the website, may have entered data identifying the user into some other website, or may have provided information in connection with a previous interaction between the user and the website. For example, the user may have previously logged into the website which caused the website to create a persistent first party cookie on the user's computer from which the website is able to positively identify the user. Other sources of data may be used as well, such as the visitor's IP address, user's name, telephone number, physical address, combination of various network addresses, telephone number of a mobile device being used to access the website, server-side visitor data, or any combination of ascertainable information. In one implementation, the identifier assigned by the website to the visitor is posted to the presence service and used by the presence server to identify the visitor.

For example, in some instances a user may be asked to type in their phone number so that an agent can call them back. Visitor-side presence, in this instance, may use the phone number from the web form where the visitor entered it. When an agent calls the visitor back, the presence-powered button on the agent's CRM page can use the phone number for that customer to co-browse with the customer, as quickly as the moment the visitor answers their phone.

In one implementation, when the user first navigates to the website, presence script will call a connect( ) function to cause the visitor to post presence information to the presence system. The presence script optionally may be included as part of the co-browse script. The connect( ) function is called each time the visitor navigates to a new page and may be called periodically while the visitor is on a given page to maintain the information at the presence system. When the visitor moves to a new page or re-posts presence information the presence system will match the new visitor information with the previous presence information for the visitor to enable the current presence information for the visitor to be updated. Presence information may include, for example, web page identity and browser information as well as the visitor ID 25 assigned by the website.

The second browser 14, under the control of a customer support agent, will periodically query the presence server for information about visitors to the website (arrow 220). In one implementation, the agent may look up information about a specific visitor or may query for a list of all visitors. In other implementations the agent may be provided with an option to query for a list of specific visitors. The presence server 34 provides, in response, query results (arrow 230).

In one implementation, the use of presence is of particular value where the agent is engaged with a particular visitor. The use of presence, in this instance, enables the agent to watch for events related to that specific visitor such as when the visitor first visits the website, and when the visitor navigates within the website.

The use of presence enables the agent to initiate co-browsing with the visitor without requiring the visitor to take additional action. For example, an implementation without presence requires the visitor to take some action to start the session, such as hitting a hot key combination or clicking a link at the bottom of the visitor's web page 22, causing the session ID 32 to appear. The visitor reads the session ID to the agent, who uses it to identify the visitor's session on co-browse service 20. Presence eliminates many of those steps, by allowing the agent to remotely launch the session and connect to it with a single click and (possibly) no action whatsoever by the visitor. In one such implementation, the visitor sees a modal appear on top of web page 22, asking the visitor's permission to allow the agent to browse the website together. In another implementation, the agent might surreptitiously view the web page without the visitor's knowledge.

As discussed in greater detail below, the presence server 34 may require the second browser 14 to have a security token authorizing the request before it will respond to the agent with the query results. The presence response enables the agent to know information about visitors that are on the website 24, such as who they are and what webpages the visitors are viewing or recently viewed.

If the agent is interested in participating in a co-browse session with a particular visitor, the agent sends a signal to the presence server 34 indicating that the agent would like to signal the visitor to start a co-browse session (arrow 240). The presence server will validate the agent's authorization to co-browse with the selected visitor and, if the agent is authorized, signal the first browser 10 to start a co-browse session (arrow 250). The agent may also signal visitors who have recently (within the last few minutes) been present on the website. Agent signaling may be used, for example, to start a co-browse session with the visitor. When the agent signals a visitor to start a co-browse session, if the visitor has an open connection (websocket) to the presence service, the visitor will be signaled immediately. If the visitor does not have an open connection, the visitor will be signaled the next time they invoke the connect( ) function.

When the co-browse JavaScript 26 at the first browser receives the signal from the presence server 34, the co-browse JavaScript 26 at the visitor starts a co-browse session 18 via co-browse service 20 (arrow 260). Updates on the co-browse session 18 are relayed by co-browse service 20 to the second browser 14 (arrow 270) to enable the agent to co-browse the webpage 22 shown by the visitor's browser 10. The visitor presence identity used by the presence system may be used by the agent and visitor to identify the co-browse session in the co-browse system to enable the agent to identify and connect to the correct co-browse session at the co-browse system.

In the previous description, the co-browse session is associated with an identifier such as the visitor ID 25 known to the website and the CRM system, which enables the agent to find the correct co-browse session at the co-browse service. The identifier, in this example, is not necessarily a co-browse session ID. In an alternate example, as shown in FIG. 2 via arrows 262-268, a separate co-browse session ID is assigned and communicated to the participants. In this implementation, as shown in FIG. 2, when the first browser 10 starts co-browse session 18, co-browse service 20 assigns a co-browse session ID 32 to the co-browse session 18. The co-browse session ID 32 is passed from the co-browse service 20 to the first browser 10 (arrow 262) which posts the co-browse session ID to the presence server 34 (arrow 264). Presence server provides agent 14 with a visitor presence update to communicate to the agent that the co-browse session has started and to provide the agent with the co-browse session ID 32 (arrow 266). The agent then joins co-browse session 18 using co-browse session ID 32 (arrow 268).

Figure 3:
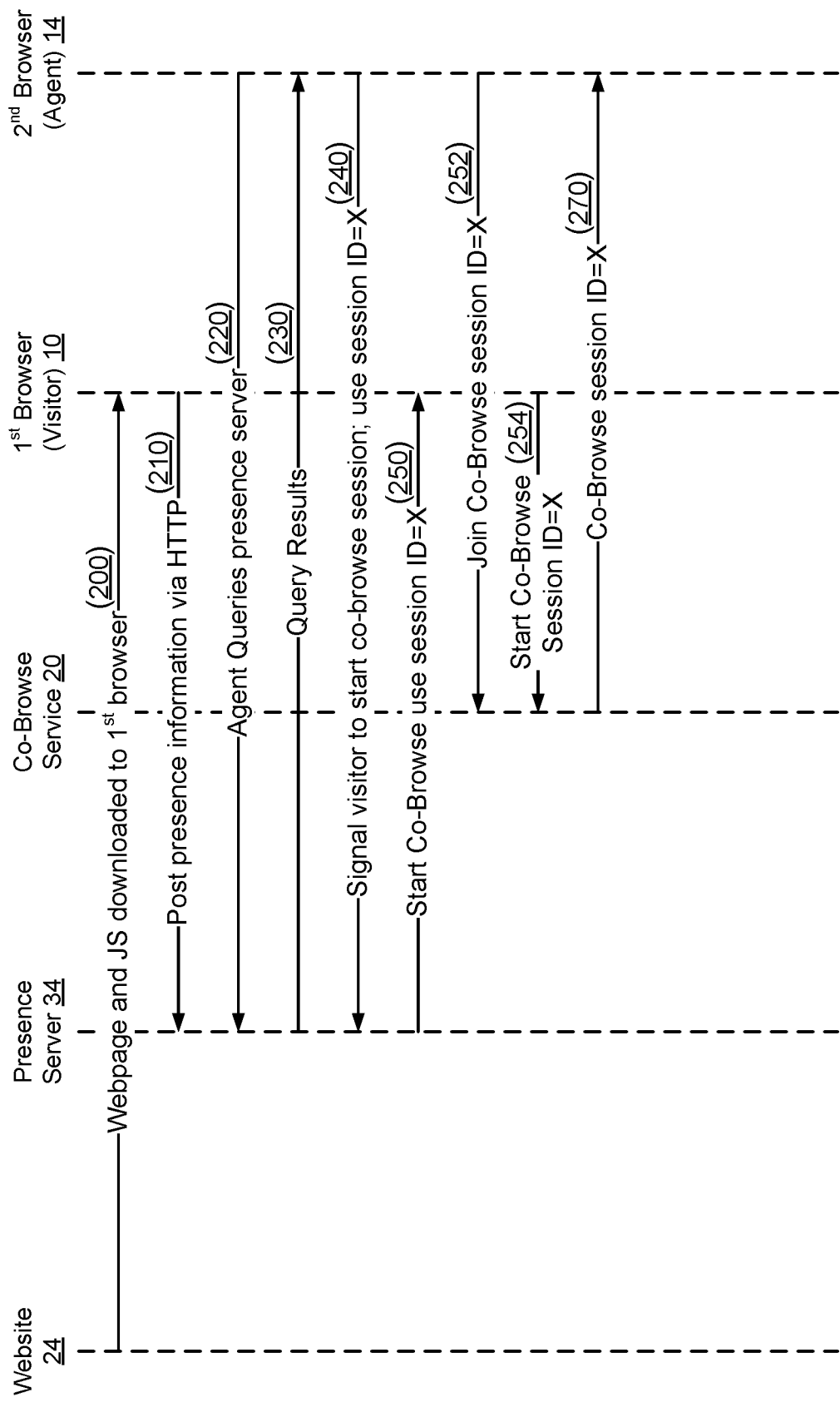

In another implementation, as shown in FIG. 3, rather than having the co-browse session ID 32 assigned by the co-browse service 20, the ID may be assigned by the agent. In this implementation, the agent will open a connection to the co-browse service indicating that, when a co-browse session with session ID=X starts, the agent should be joined to the session (arrow 252). The presence server will signal the visitor and provide the visitor with the co-browse session ID=X. The visitor will then start a co-browsing session 18 with co-browse session ID=X (arrow 254). Once the session is started, the co-browse service will then join the agent to the co-browse session to enable the second browser to receive updates on the co-browse session from the first browser (arrow 270). There therefore are multiple ways to enable the agent to find a co-browse session started by the visitor via the presence system.

In one implementation, information from the presence system is integrated with a CRM system on the agent computer to enable the agent to access presence information via the CRM system and interact with visitors via the CRM system.

For agents responsible for handling large numbers of calls, the use of presence to automatically establish co-browse sessions can shorten calls and decrease effort. First, calls are able to be shorter since the agent no longer wastes time asking what the visitor sees or describing objects the visitor needs to find. The agent has an immediate view of the visitor's webpage 22 and the agent can remotely scroll, point and highlight objects of interest directly on that web page. Co-browse reduces the amount of effort for both the agent and visitor, since neither party needs to describe verbally elements they see or need to find. Further, co-browsing is reliable, since the session simply involves transmission of the DOM from the visitor to the agent. The visitor does not need to download or install any software, which takes time, might be difficult for the visitor to install or might be blocked by security policies imposed on the visitor's computer 12. DOM-based co-browse can be made secure because the website owner has the ability to mask any HTML object on the website that may contain sensitive customer information that the website owner does not want the agent to see. Masked content never leaves the visitor's browser 10, never touches co-browse service 20, and never reaches the agent's browser 14.

Similarly, where the Agent's computer 10 has Computer Telephony Integration (CTI), such that the call is placed through the Agent's computer, the phone number used by the CTI system can be used to pop the customer's CRM record the moment the Agent takes the customer's inbound call. Any information that appears both in the CRM 36 and is known to the website 24 can be used with presence to identify the customer on the website and automatically pop the co-browse view for the agent.

In some implementations the customer would be expecting the co-browse to occur. In other instances the customer may not expect the agent to be able to view their browser window. In the latter case, after the agent takes action to initiate a co-browse session with the visitor, a modal may be displayed on the visitor's browser that asks for the visitor's permission to allow the agent to co-browse with the visitor. To increase the likelihood the visitor will accept this invite, the modal may include the name of the agent, a photo of the agent, and even some personal information about the agent such as the agent's hobbies. In either instance, whether the co-browse begins automatically or after the visitor accepts the agent's invitation, presence enables the agent to initiate the co-browse experience with whomever has called. Specifically, when the agent accepts the call or chat session, the Agent's console or chat window will query the presence service and immediately start a co-browse with the intended visitor or immediately populate the modal to the visitor to allow the visitor to accept the co-browse session with the agent. In effect, this enables a voice call or a chat session to automatically include a visual aspect without requiring the agent to previously interact with the visitor. It is independent of (hence fully compatible with) whatever routing logic is used to assign the agent to the visitor's call or chat.

By allowing the agent to immediately see what the visitor is doing on the website, the amount of time it takes the agent to engage the visitor may be reduced dramatically. For example, when a visitor calls for support, typically the agent that receives the call will need to ask the visitor what they are trying to do on the site, ask them where they are on the site, and otherwise talk with the person to ascertain the nature of the issue before the agent is able to start providing advice. This process may take on the order of a full minute. By immediately showing the agent where the visitor is located on the site and what the visitor is doing, the agent can bypass this initial conversation and simply start out with stating, e.g. "I see you are looking at the shopping cart and trying to enter a coupon code". This greatly reduces the amount of time the agent needs to spend with the customer to thereby increase agent productivity while at the same time increasing customer satisfaction since the agent can more directly provide pertinent advice to the visitor without requiring the visitor to orally describe any issues the visitor is having with the website. Since presence allows the agent and visitor to connect visually without expending effort or time and with near 100% reliability, it can be confidently used on nearly every interaction.

Presence information may also be used to determine website usability. For example, a website designer may want to watch how people interact with particular aspects of the website rather than simply looking at statistics. Script on the website can cause visitors to post presence data and, whenever the presence data indicates that a visitor is at a particular feature of the website, an agent may be notified of the event and a co-browse session with that visitor may commence. The agent can then watch visitors at particular places on the website to see whether particular aspects of the website are causing confusion or should be redesigned. Optionally the visitor's interaction with that aspect of the website may be recorded as well to enable the agent to watch the interaction at a later point in time.

Integrating presence with a CRM system may have particular benefit to agents acting as inside sales representatives making outbound calls. Inside sales representatives are typically responsible for periodically contacting a set of customers to attempt to increase sales volume. However, selecting the best customer to call at that moment is not straightforward.

FIGS. 4-7 show an example inside sales representative's views of a customer record management (CRM) client 36 at the second computer 16 in CRM window 400, according to an embodiment. As shown in FIG. 4 within the customer relationship management system, the inside sales representative can see a list of records 410 for which the inside sales representative is responsible. Each record 410 might include a contact name 411, the account name 413, a phone number for the contact 412, and a date of the most recent conversation to show the inside sales representative when the person/account was last contacted. Other information such as historical information about annual sales 416 may also be displayed. The particular set of information included in each record 410 will depend on the implementation.

According to an implementation, the second browser 14 obtains visitor information related to CRM records 410 in CRM system 36. The second browser 14 uses this information to query presence server 34 as to whether any of the visitors to the website 24 match the record information 410 in the CRM system 36 (see FIGS. 2 and 3 arrow 220). In another implementation, the agent queries the presence server for a list of all visitors on the website and matches visitor identification information from the presence server with CRM records to determine which known visitors are present on the website.

The presence server will respond with query results (FIGS. 2 and 3 arrow 230) to identify any visitors on the website 24 that have presence information matching information in a CRM record 38 in the CRM system 36. The second browser 14 passes the identifying information to the CRM system's webpage 400. The CRM system webpage highlights the records of those accounts where a visitor is currently on the website 24. For example, in FIGS. 4-6, records associated with visitors that are currently visiting the website have a co-browse button 420 highlighted. Highlighting co-browse button 420 provides a visual status indication to the agent indicating that a visitor associated with that CRM record currently is on the website. The knowledge of which contacts are currently on the website makes it possible for the inside sales representative to proactively call, text, or chat with the contact associated with the account while the contact is focused on the website. This makes the task of selecting who to call much easier for the inside sales representative, since the inside sales representative knows that a person actively looking at the company's website is more likely to be receptive to receiving a telephone call from the company at that moment.

In addition, the inside sales representative can also use the CRM system to determine what the visitor is doing at the website. In FIG. 4, the status indicators for visitors associated with the SkyFall and the Football Tee Co. customer accounts are highlighted. This indicates that the presence system has identified those contacts to the CRM system as currently being on the website. In one implementation, the highlighting results in the co-browse buttons 420 for these accounts having a different color than the other co-browse buttons for other accounts.

Figure 5:
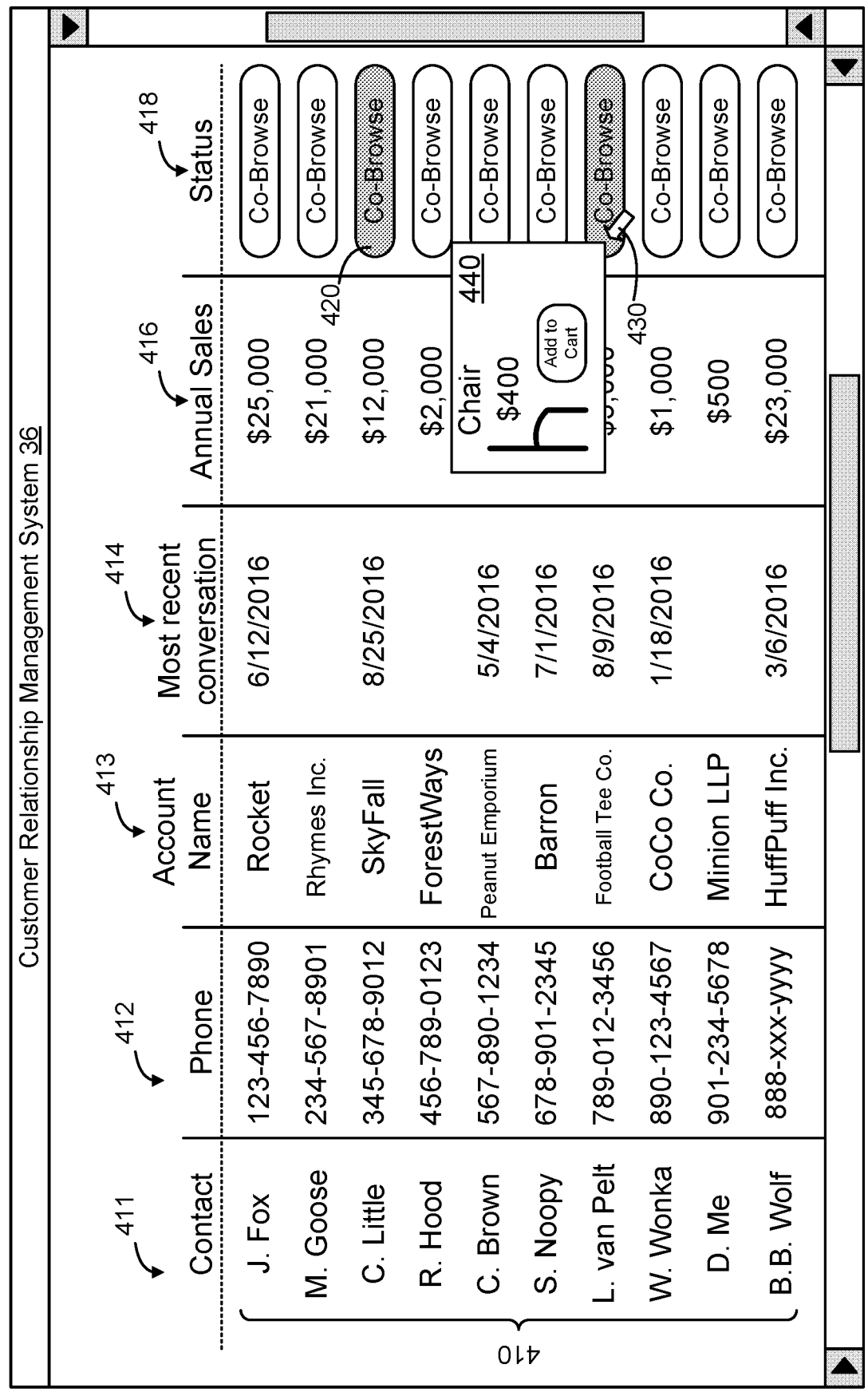

According to an implementation, the presence system obtains visitor website location information about the location of the user on the website, e.g. via href, and passes the visitor website location information to the CRM system. As shown in FIG. 5, when the inside sales representative hovers their mouse cursor over the highlighted co-browse button, a small window 440 pops up as a tooltip on the cursor 430. The window 440 contains a browser in which the link (e.g. href) for the visitor obtained from the presence system is loaded. This enables the inside sales representative to see the portion of the website that the visitor is currently viewing without launching a co-browse session with the visitor.

Figure 6:
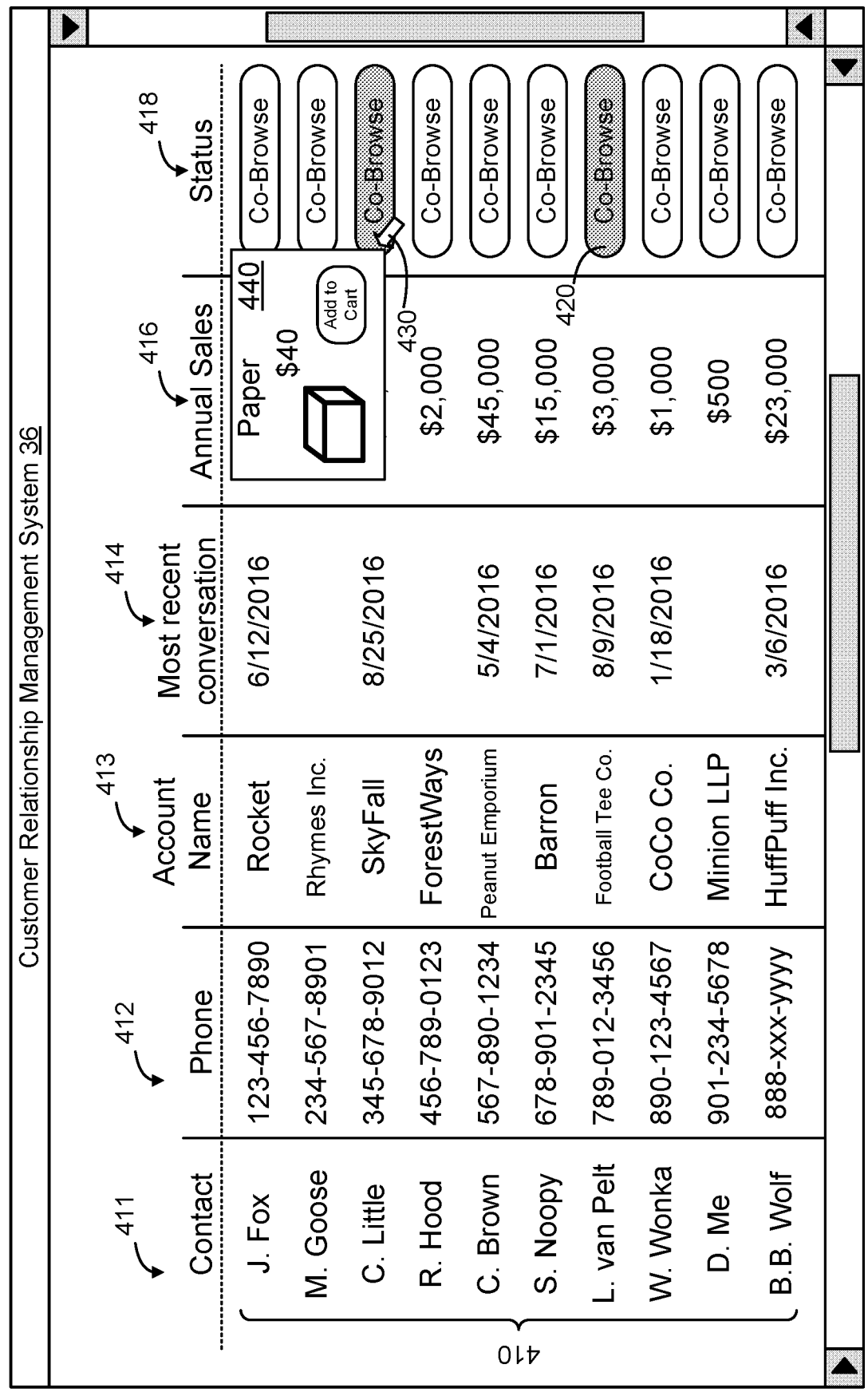

For example, in FIGS. 5 and 6 the co-browse buttons 420 for the SkyFall and Football Tee Co. accounts are highlighted. In FIG. 5 the inside sales representative has moved the mouse cursor 430 to hover over the co-browse button for the Football Tee Co. account and the inside sales representative can see that the contact for that account is looking at $400 chairs. In FIG. 6 the inside sales representative has moved the mouse cursor 430 to hover over the co-browse button for the SkyFall account and the inside sales representative can see that the contact is looking at $40 cases of paper. By having this visual information the inside sales representative can proactively contact one of the account contacts, for example via the telephone number on the account.

Knowing that the account representative is currently on the website and what the person is doing on the website provides the inside sales representative with valuable information that can be used in myriad ways to increase the likelihood of consummating a sale with the contact. Specifically, the knowledge that the visitor is currently on the site enables the inside sales representative to select the hottest prospect to phone next. For example, the inside sales representative can click on the visitor's phone number to call the visitor. When the visitor answers or when the call is placed a co-browse session can automatically be initiated with the visitor. Alternatively, when the visitor answers the agent may ask whether co-browsing would be beneficial, and then click the co-browse button to launch a co-browse session. In either instance the agent is able to visually engage the visitor by being able to see what the visitor is doing on the website.

Figure 7:
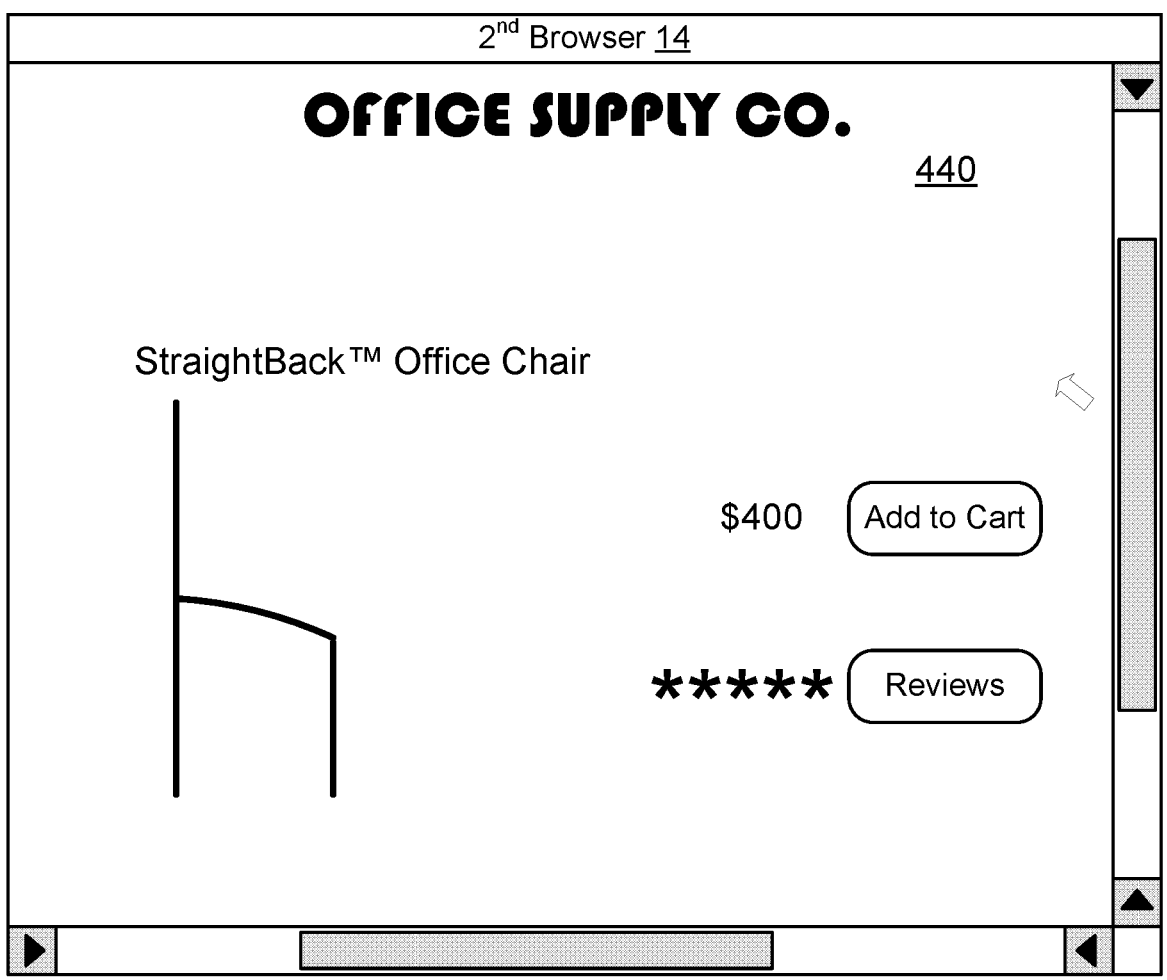

In one implementation, the highlighted co-browse button also indicates to the agent that a co-browse session for that customer is possible. If the inside sales representative clicks on the highlighted co-browse button a co-browse session will be launched with the visitor. FIG. 7. shows an example view where the inside sales representative clicks on the co-browse button 420 for the Football Tee Co. As shown in FIG. 7, clicking on the co-browse button 420 will cause a co-browse session to be started to enable the inside sales representative to surreptitiously watch the visitors interaction on the site. The inside sales representative may then call the visitor if the inside sales representative would like to also talk to the visitor.

In one implementation, when the inside sales representative sees a visitor on the site, the inside sales representative may click on a button to proactively pop a chat invitation to the customer. In another implementation, the modal invite specifically mentions that the visitor's assigned account representative is available to engage in a conversation. The invitation may include a picture of the account representative and other information about the account representative. If the visitor accepts the invite, during the chat the inside sales representative can invite the customer to co-browse the site together to escalate the chat/phone call to incorporate a co-browse session.

In all instances, having knowledge of the presence of the visitor on the website enables the inside sales representative select a customer who is more likely to engage the sales representative at this moment in time, since the person is already on the company website. Thus, presence allows the sales representative to turn a cold call into a hot call to thereby greatly increase the potential effectiveness of the sales representative's effort.

Assuming that the agent selects to co-browse with the visitor from the Football Tee Co. account, when the agent clicks on co-browse button 420 for the Football Tee Co. account the agent view will be provided with a browser view showing the co-browse session with the Football Tee Co. visitor. FIG. 7 shows a view of the Agent's browser (second browser 14) when the agent clicks on co-browse button 420 for the Football Tee Co. account. The agent can then interact with the Football Tee Co. visitor, if desired, to assist the Football Tee Co. visitor in connection with the visitor's interaction with the website. For example, the agent may contact the visitor via chat, voice, etc. while already being able to see what the visitor is doing on the site. Likewise, where the agent was previously interacting with the visitor via chat or voice, the agent can now also see where the visitor is on the website without requiring the visitor to take any affirmative action like clicking a button on the website. Since the inside sales representative has presence information about the visitor, the inside sales representative can guide the visitor through the website and otherwise visually engage the visitor.

Although FIGS. 5-7 show an implementation in which the tooltip 440 shows a view of the current webpage where the visitor is currently located, in another implementation, as shown in FIGS. 8-10, hovering the mouse cursor 430 over the co-browse button 420 causes a list of URLs 800 to be displayed at the mouse tooltip. In one implementation the top entry is the URL of the current location of the visitor on the website. Other entries lower in the list indicate where the user was on the website in earlier instances. The tooltip, in this implementation, may show the date/time the visitor initially browsed the page, the elapsed time (how long the person has been on the page) as well as when and for how long the visitor spent on other web pages on the website, identified by the subsequent URLs in the list. Optionally the tooltip may also provide other information about the visitor, such as whether the visitor is accessing the website via a mobile device.

As shown in FIGS. 9 and 10, when the inside sales representative scrolls through the list of URLs, thumbnail versions of the webpages accessed by the visitor are shown. For example, in FIG. 9 the inside sales representative has moved the mouse cursor to hover over the second URL in the list, causing it to be highlighted and showing the inside sales representative that the visitor was looking at website associated with chairs for two minutes just before looking at the current website. As shown in FIG. 10, when the inside sales representative hovers over the third entry in the list, the third URL is highlighted and a tooltip popup window shows the inside sales representative that prior to that the visitor was looking at a website for paper for a duration of three minutes. If the inside sales representative hovers over the top entry, a window showing the current location of the user on the webpage is displayed on the tooltip, as described above in connection with FIGS. 6-7. If the inside sales representative clicks on the top entry in the list (1.ws.com in FIGS. 8-10) a co-browse session will be started to enable the inside sales representative to see what the visitor is doing on the website. If one of the other links is clicked, a browser will open to show the inside sales representative the webpage associated with the selected URL. This implementation enables the inside sales representative to review the browsing history of the visitor in addition to the current location of the visitor on the website.

Using location links to show the current and/or past locations of the visitor on the website works in instances where the website includes primarily static content. For example, location.href may be used to point to an absolute URL, a relative URL to specify a file within a website, or to point to an anchor within a page. Where these aspects of the webpage include static content, presenting the inside sales representative with a tooltip image of what the visitor is looking at is feasible because of the fact that the content at that location of the webpage is static, i.e. not dependent on visitor input.

Some websites contain significant dynamic content, which is defined herein as content that depends on visitor input. An example of a website that includes dynamic content may be a stock brokerage website in which the visitor is accessing account information about their stock portfolio. Another example of a website that may include dynamic content is a website designed to enable a person to interact with tax preparation software. In these and other instances, the content of the website that is shown to the visitor depends to a great extent on interaction between the visitor and the website. Where the website includes significant dynamic content, showing the inside sales representative a static image may not convey sufficient information about what the visitor is actually looking at on the webpage. In this instance, it may be preferable to start a co-browse session with each identified visitor and show a small version of the co-browse session in the tooltip 440 when the inside sales representative hovers cursor 430 over highlighted co-browse button 420. Accordingly, to enable the inside sales representative to see what the visitor is doing on a website that includes lots of user-action dependent dynamic content, the actual interaction between the visitor and website is captured in a co-browse session that may then be displayed to the inside sales representative in real time.

In one implementation, when an agent is in a co-browse session with a visitor, the agent can scroll the agent's view of the web page without affecting the visitor's framed view of the website. In this implementation, a graphic is included in the agent's view of the website such as by drawing a colored rectangle around the portion of the page actually viewed in that moment by the visitor. This implementation enables the agent to look at the entire web page to better understand the context of the customer's browsing experience. Optionally a toggle may be included in the agent view to enable the agent to quickly return to showing the exact portion of the page actually being viewed in that moment by the visitor.

In another implementation, if a website visitor places a phone call to obtain support help, the computer telephony integration (CTI) system at the agent recognizes the customer from their phone number and creates a case object for the visitor in the CRM system. When the call is assigned to an agent and routed to the assigned agent, the case object is automatically accessed and displayed to the agent in the agent's CRM window. Concurrently, as the call is being routed, the telephone number is used to poll the presence system to initiate a co-browse session with the customer. When the agent is presented with the case object, the co-browse session is displayed in a browser so that the agent is able to immediately browse with the visitor and see what the caller is doing on the website, all without requiring the agent to take any action other than accept the assigned incoming call. In an implementation where the website requires visitor consent to enable the agent to view the visitor's browser, the caller may be prompted to confirm that the customer has consented to have the agent participate in a co-browse session with the visitor. Optionally the visitor may be prompted prior to placing the telephone call, and the co-browse session starts the moment the agent accepts the assigned call.

In another implementation, the agent is able to initiate co-browse sessions via CRM/chat. In this instance, the customer clicks on a chat dialog to initiate a chat session with a customer service representative (agent). JavaScript in the customer's browser senses the chat session and publishes a unique identifier for that chat session to the presence system. The agent then takes the chat and, from the chat system, obtains the unique identifier for the visitor. The co-browse button in the CRM system or in the agent's chat system queries the presence server for a website visitor associated with the unique identifier. When the presence server identifies the visitor, the agent's co-browse button will be highlighted. The co-browse viewer auto-opens for the agent or the agent clicks the illuminated button to launch the co-browse viewer. Optionally the visitor accepts the agents' invitation to co-browse by clicking an "allow" button on a modal that appears either in the website or within the chat client.

In addition to using presence to detect the visitors on a website, presence may also be used in some implementations to detect the availability of particular agents. A visitor may have an assigned customer representative. When the visitor is on the website, the presence system will detect the visitor. If the CRM system in use by the agents for the website has a CRM record for the visitor, and the visitor has been assigned to a particular agent within the CRM system, the presence system may be instructed to notify the visitor that the visitor's assigned agent is available. Accordingly, instead of the visitor being provided with a standard chat invitation to chat with any available customer representative, the visitor may instead be provided with a chat invitation to chat with their personal representative. The invitation may include a photo of their personal representative and some information about the representative, such as how they enjoy using vacation time. If the agent is unavailable, the visitor may be presented with an invitation to chat with another representative and may also be provided with an option to chat with their assigned customer service representative at a predefined point of time in the future when the assigned customer service representative is scheduled to return.

For example, a user of on-line tax preparation software may work on a tax return, take a break, and return at a later point in time to continue working on the tax return. If the user receives assistance from a first agent while on the website during the initial stages of preparing the tax return, the user may prefer to continue working with the same agent when they return to the website at the later point in time. The visitor's presence information may be used to automatically identify the agent with whom the visitor was previously working and, if the agent becomes available, to route any contact (call/chat) associated with the visitor to the same agent that previously helped the visitor. Likewise, in connection with sales, a visitor may be notified that their assigned sales representative is available to interact with the visitor while the visitor is on the website.

Optionally, presence information about the visitor may be passed to the presence system and automatically transmitted by the presence system to the CRM system in connection with a prompt from the visitor. For example, the visitor may be provided with a feature on the website, such as a "Find my Agent" button, that will cause the agent associated with the visitor to be identified. In this instance, when the user clicks on the "Find my Agent" button, the visitor's presence information is passed to the presence system and automatically sent from the presence system to the CRM system. The CRM system then uses the presence information to identify the visitor's CRM record to determine which agent is responsible for the CRM record. The agent may then be notified that the visitor is on the website and has indicated that they would like to work with the same agent who previously assisted them. If the agent is available the agent may immediately engage the visitor. If the agent is busy with another customer, the visitor may be notified that they have been placed in a queue for their assigned agent and that the agent will be available soon.

Figure 11:
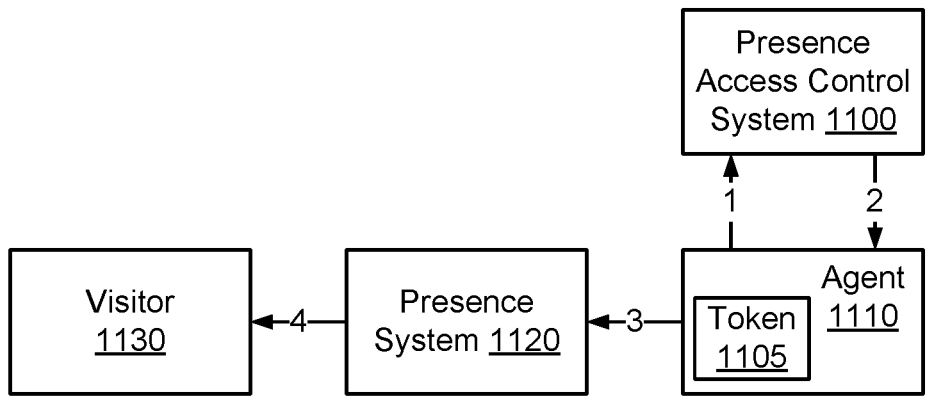
FIGS. 11-12 are functional block diagrams of aspects of an example presence system for use in presence enhanced co-browse customer support system such as the presence enhanced co-browsing customer support system of FIG. 1.

FIG. 11 shows an implementation in which a presence access control system 1100 is implemented to ensure the agent 1110 has sufficient privilege to access presence information about website visitors 1130. Not all agents authorized to provide customer support may have access to presence information of visitors on a website. Likewise, different agents may be responsible for different subsets of visitors and thus the presence information available to an agent may need to be restricted. Finally, particular visitors may opt in to having their presence made available or may opt out of having their presence made available to the agents. Accordingly, in one implementation, a security system is provided to control access to presence information by the agents.

As shown in FIG. 11, in one embodiment, a presence access control system 1100 generates and provides authorization tokens 1105 to the agent 1110. The presence access control system 1100 may be implemented as a stand-alone server, may be implemented as part of co-browse service 20, may be implemented by website 24, or by a separate process running on presence system 34.

When an agent issues a request to the presence system 1120, the presence system 1120 verifies the identity of the agent and ensures that the particular agent is authorized to carry out the requested operation. In one implementation this is accomplished using authorization tokens issued by presence access control system 1100.

All agent side requests to the presence system 1120 carry an authorization token which is obtained from the presence access control system 1100. In one implementation, the presence access control system 1100 uses the JSON Web Token (JWT) standard for creating, signing, and verifying authorization tokens.

For an agent to obtain an authorization token for presence, the agent passes credentials to the presence access control system 1100 to prove the agent's identity (FIG. 11 arrow 1). The presence access control system 1100 verifies the agent's credentials (authentication) and determines whether the agent has permission to access the presence system 1120 and the scope of the agent's permission (authorization). Depending on the implementation, the presence access control system 1100 may be accessible via Soap 1.2 Web Services Definition Language (WSDL), JavaScript Object Notation (JSON) Representational State Transfer (REST), or eXtensible Markup Language (XML) REST. REST specifies a set of four HTTP methods that enable actions to be taken with a URL. The four methods defined in REST are Post (create), Get (read), Put (update or create), and Delete (delete). One advantage of using REST is that it is easy to be called from JavaScript, so that script running on the agent 1110 can easily interface with presence access control system 1100 to request authorization for presence tokens. Also, since REST is built on HTTP, all the security features for authentication available in HTTP are available in REST.

The presence access control system 1100 may accept many different forms of credentials depending on the implementation. For example, the presence access control system 1100 may accept any combination of identifying credentials, such as the agent's user name and password, Security Assertion Markup Language (SAML) or other known methods. Other credentials may be used, and the particular credentials required will depend on the implementation. In one implementation the presence access control system 1100 does not accept the agent's CRM system login credentials as sufficient to access presence. This enables access to presence to be separated from access to the CRM system, so that simply obtaining access by an agent to the CRM system does not automatically enable the agent to also have access to presence information of users on the website.

In one implementation, in addition to credentials, the agent must specify a Group ID. The group ID specifies a subset of visitors to the website about whom the agent is able to obtain presence information. An individual agent 1110 may be a member of multiple groups, but at any given time the individual agent 1110 authenticates in a particular group. If an agent 1110 needs to carry out operations in multiple groups, the agent must obtain multiple authorization tokens—one token for each group.

In one implementation, access to presence requires the agent to have a current presence subscription. When the agent attempts to obtain a token from the presence access control system 1100, the presence access control system will check whether the Agent is authorized to access presence and that the presence subscription is current, in addition to determining authentication.

To prevent tokens from enabling unfettered access to presence information for extended periods of time, in one implementation the tokens have a "time to live" attribute which specifies a period of time during which the token will remain valid. When requesting a token, the presence access control system 1100 specifies a time-to-live duration for the token. In one implementation tokens may be issued for the duration requested by the agent, with a maximum duration of up to two hours or other time interval. Since obtaining a token is resource intensive on the presence access control system, the agent should obtain a token and reuse it until it expires or the agent logs out, rather than obtaining a new token for every operation.

The authorization token may be obtained server side using the SOAP or REST API. It may be stored server side, for example in session state, and used in subsequent server side requests to the presence system 1120.

Alternatively, a token obtained server side may be used client side by the Presence JavaScript API on the agent 1110. The token may be embedded in the page in a data-authtoken attribute of the co-browse script or meta tag, or it may be passed into the JavaScript API using Authorization.setToken( ). Finally, a token may be obtained client side by passing credentials into Authorization.authorize( ).

When setToken( ) or authorize( ) is used, the authorization token is stored in agent 1110 browser's local storage to allow reuse. All calls to the presence system API will automatically use the stored token, as long as those calls are made from secure pages on the same fully qualified domain.

When a request is made, the presence system 1120 will validate the authorization token presented in connection with the request. As noted above, the token may be presented by the agent 1110 in the Authorization header, for REST requests, or in the first message on a websocket connection. The presence system 1120 verifies the token signature, that it has not expired, and that the group ID in the token matches the group ID in the request. In some implementations an agent is able to interact with all visitors associated with the group ID, and in other implementations the agent is authorized to interact with a subset of visitors associated with the group ID.

Requests to the presence system 1120 from secure browsers will include an Origin header. The presence system 1120 will reject requests with a non-whitelisted Origin domain. If and only if the request Origin is on the whitelist, the presence system 1120 will respond with the Access-Control-Allow-Origin header set to the Origin domain.

JSON Web Tokens require a shared secret between the token issuer and the consumer. In one implementation, the presence system 1120 generates a new shared secret every two hours and passes it to the presence access control system 1100 via an https request to an internal endpoint in a VPN established between the presence system 1120 and the presence access control system 1100.

Figure 12:
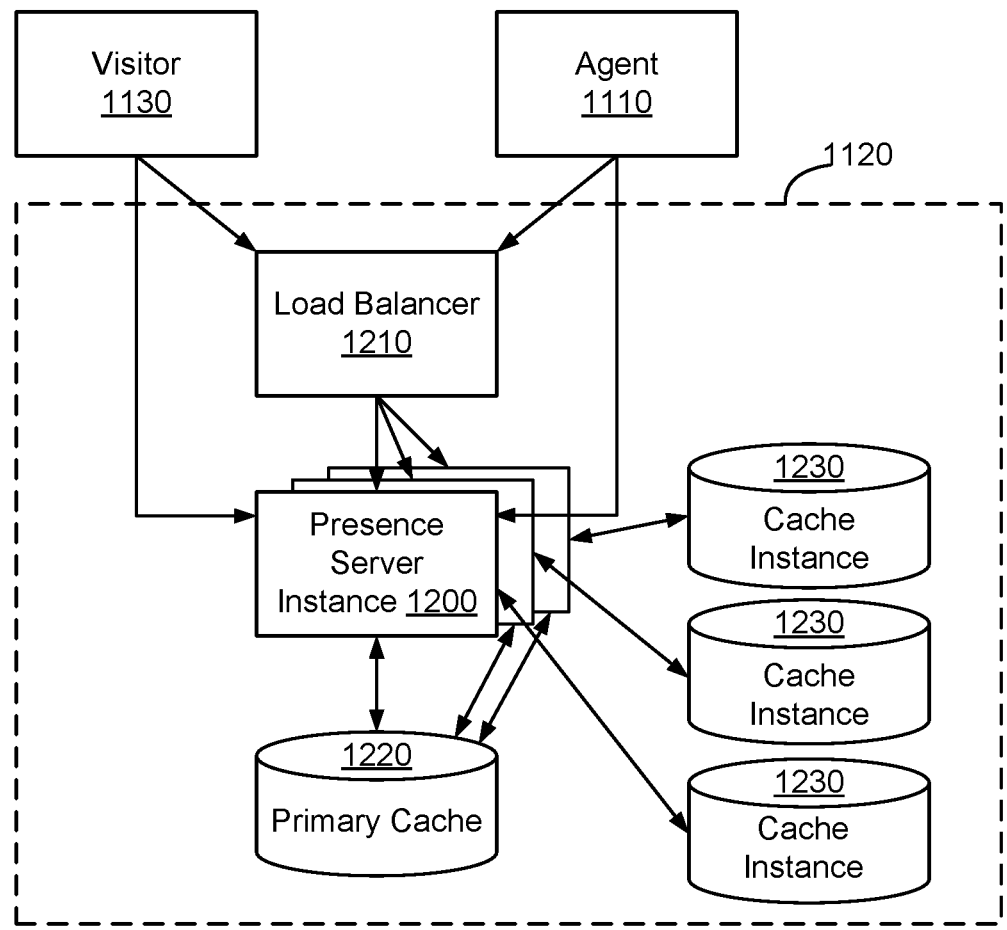

FIG. 12 shows an example architecture of the presence system 1120. As shown in FIG. 12, both the visitor 1130 and the agent 1110 communicate with the presence system 1120. The visitor posts updates to visitor presence information, and the agent communicates with the presence system 1120 to obtain information on visitors on website 24. The agent can also signal the presence system 1120 to cause the presence system 1120 to signal the visitor to initiate a co-browse session so that the agent can see what the visitor is seeing on the website.

In one example architecture, the presence system 1120 includes multiple presence server instances 1200 behind a load balancer 1210. Visitors can make http requests to the load balancer 1210, which will assign one of the presence servers in presence system 1120 to handle the request. Once the visitor has been assigned to one of the presence server instances, the visitor will open a connection directly to the specific presence server instance to which they are assigned. The presence server instance to which a visitor is assigned is referred to herein as the "assigned presence server instance".

The connection opened by the visitor may be implemented as a WebSocket, a SockJS connection, or as another type of connection. The WebSocket protocol is defined by Internet Engineering Task Force (IETF) Request For Comments (RFC) 6455 and specifies a low latency, full duplex, cross-domain communication channel between the visitor's browser and a webserver. SockJS is a browser JavaScript library that provides a WebSocket-like object, i.e. a low latency, full duplex, cross-domain communication channel between the visitor's browser and the webserver (assigned presence server instance). For convenience, this description will use the term "websocket" as a generic term for connections implemented according to the WebSocket protocol defined by IETF RFC 6455, SockJS connections, and other similar connections. Presence information is sent from the visitor to the server on the websocket and likewise communications to the visitor are passed over the websocket.

In one implementation, when a visitor needs a presence server assignment, the visitor sends an HTTP request to the presence system. In this implementation, when an HTTP request first arrives at presence system 1120 the HTTP request is forward to load balancer 1210 which uses a round robin process to forward the http request to one of the presence server instances 1200. HTTP requests occur when a visitor first arrives at the website. Upon arrival at a scripted site the visitor will send an initial HTTP request (see FIG. 2 arrow 210) to presence service. The load balancer 1210 forwards the requests to any presence server instance 1200 without regard to the load currently being handled by that server instance.

The assigned server instance 1200 will look into the primary cache 1220 to determine the status information of each of the presence server instances 1200 to determine which presence server instance 1200 should handle the websocket for the visitor. Each presence server instance 1200 periodically transmits a status update, i.e. sever load, to the primary cache 1220. The presence server instance assigned to handle the HTTP request will look at the statuses of the presence server instances to determine which one of the presence server instances 1200 should handle the websocket for the visitor. In this manner, since websockets are more processor intensive and reflect a persistent communication stream, websocket load balancing may be performed separately from HTTP load balancing and be based on status information to ensure that the presence server instance that is assigned to handle the websocket for the visitor has sufficient processing capacity.

Once assigned to an instance, the visitor sticks to it for as long as that instance is running (not crashed or scaled down). The visitor keeps a cookie which indicates the assigned instance name so that it does not need to go back to the service load balancer on each page navigate. Instead, the visitor can just open a new websocket connection to the assigned presence server instance. The visitor then sends presence information on the websocket.

Presence information about visitors is stored in a data structure referred to herein as a "cache". Each time the visitor posts new presence information to the presence system the new presence information will be stored in the cache. Visitors may contact the presence system multiple times as the visitor moves about website 24. For example, each time the visitor loads a new webpage from the website the visitor will post new presence information to the presence system. It is advantageous, in connection with finding the visitor and allowing the agents to signal the visitor, that the presence posts from the visitor be stored in the cache in such a manner that they are able to be located at a subsequent point in time.

FIG. 12 shows two options of how the cache may be configured. In a first option, a primary cache 1220 is used by all presence server instances 1200. In this implementation, all presence server instances 1200 store information in the same data structure (same cache), so even if more than one presence server instance handles a given visitor, all information from the visitor can be stored together in the cache. Likewise, any presence server instance can search and retrieve information about any visitor by accessing the single primary cache 1220. In another implementation, rather than using a single primary cache 1220, multiple separate cache instances 1230 are used to store the visitor presence information. In this implementation each presence server instance 1200 may have its own assigned cache instance 1230, groups of presence server instances 1200 may share a cache instance 1230, or the presence server instances may store visitor information across the set of cache instances 1230.

There are some tradeoffs to make in terms of scalability vs. simplicity. Using a single cache 1220 is simplest and most flexible in terms of query functionality, but creates a single bottleneck for the whole system. Using one cache incidence 1230 per presence server instance is highly scalable, but then achieving visitor stickiness and finding visitors could be more costly, as discussed in greater detail below.

With respect to scalability, it is possible to completely replicate the entire system behind separate DNS names e.g. presence1.presencesystem.net, presence2.presencesystem.net, etc., and provision customers (i.e. manually) on isolated instances of the presence system. In this implementation, a website 24 with a large number of visitors would be assigned to a dedicated presence system 34, such that the presence system provided for that website would be designed to handle the volume of presence information expected from website. Smaller websites would be able to share access to a common presence system. Because presence systems are able to be replicated in this manner for stand-alone use or for shared use, the architecture selected to implement the presence system only needs to scale up to the capacity required by the largest customer.

In one implementation, the cache used to maintain the presence data by the presence server is implemented using a Redis cache. Redis is an open source, in-memory data structure store, used as a database, cache, and message broker. It supports data structures such as strings, hashes, lists, sets, sorted sets, with range queries, bitmaps, hyperlog logs, and geospatial indexes with radius queries. Commercially available Redis caches, such as the m2-xlarge AWS elasticache, are capable of handling on the order of 70,000 operations per second. Using a single Redis cache, therefore, should enable a presence system to be able to support on the order of 500,000 simultaneous visitors on a website: 500,000 simultaneous visitors*(1 navigation per 60 seconds)*(2 operations per navigate)=16,666 operations/second, which is well within the 70,000 operations/second capability of the Redis cache.

Redis 2.8 does not support multiple writable nodes in a cluster, but it is possible to use a read-only secondary node to offload reads, which could be useful if it becomes desirable to periodically read presence data and add it to a more structured database such as a SQL database to support more flexible queries. Although an embodiment may be implemented using a Redis cache, other data structures may be utilized as well.

In an implementation, presence data is read periodically over time, for example every five minutes, to build a record of who was on the website over time. This presence data may then be sorted and either maintained by the presence system or incorporated into the CRM system to update CRM records to enable a history for the customers to be built over time. The history, in one implementation, includes a record of which customers were on the site, where the customers were located on the site, whether the customers logged in, what products were selected, and other information about what the customers did while present on the site. By incorporating this information into the CRM record, or allowing the agent to search the history maintained by the presence system, the agent is able to have this historical information available in connection with subsequent real-time interactions with the visitor.

A signaling mechanism works well if visitors "stick" to a single instance of the cache as they navigate from page to page on the website. Accordingly, in one implementation, once a visitor has been assigned to a presence server and the server has stored the visitor's presence information in an instance of the cache, the visitor information will remain stored in the selected instance of the cache except in rare events, such as an intentional scale down event or an unintentional service failure resulting in the removal or loss of the visitor's cache instance. Optionally, in connection with an intentional scale down event resulting in the elimination of a cache instance, visitor information stored in the cache to be eliminated may be copied to another cache instance prior to execution of the intentional scale down event. Likewise, visitor information may optionally be stored in multiple cache instances to provide redundancy if desired.

There are several ways to keep a visitor assigned to the same instance of the cache. In one implementation, a single primary cache 1220 is used. Since there is no alternative storage location, the visitor information is guaranteed to be mapped to the same instance of the cache even when the visitor moves within the website. Using a single primary cache 1220, however, presents a potential bottleneck to access to information.

In another implementation, where presence server instances 1200 store visitor information in separate cache instances 1230, visitors keep track of their assigned presence server instance in local storage. When the visitor is assigned to a presence server instance, an identification of the assigned presence server instance is passed back to the visitor and included by the customer in subsequent presence posts. The identification is then used by the elastic load balancing system 1210 to forward subsequent presence posts to the correct assigned presence server instance. Since the assigned presence server instance stores all information in its associated cache instance 1230, subsequent presence posts from a given visitor will be stored in the same cache instance 1230. While this is completely scalable, it has the disadvantages that the local storage will not be available if the visitor navigates to a new subdomain or protocol (because browsers restrict access to local storage by subdomain and protocol). This means the visitor will not be able to tell the presence system the identity of the assigned presence server instance which will result in the visitor switching between presence server instances more frequently. Additionally, when the agent is searching for a particular visitor, the presence system does not have a central place where the visitor-to-instance mapping is stored, so the presence server will need to query all presence server instances to find a visitor.

In yet another implementation, a combination of visitor local storage and a primary cache 1220 is used. In this implementation, information from visitor local storage is used if available, with a fallback to a lookup in a primary cache. This option allows for a primary cache 1220 to be used to store information related to the mapping between visitors and presence server instances. When the visitor navigates to a new subdomain or protocol, a lookup in the primary cache 1220 is only necessary if the visitor does not find the presence server instance assignment in local storage.

In still another implementation, a hash algorithm is used to assign visitors to cache instances. The hash algorithm must change as instances are scaled up/down, and on scaling events there would be a lot of reassignment of visitors. Therefore the hash would give a probable location for a visitor, and as a fallback if the visitor wasn't found where expected the system could look in all instances, or at least the instance that would have been indicated by the previous hash algorithm. This approach necessitates a mechanism to notify all instances whenever there is a scale up/down event. This could work well if scaling events are kept to a minimum. Using a hash is highly scalable since any presence server instance could handle posted presence information for any visitor, but a major downside is that because of the complexity of scaling events, testing would be more complex.

When a visitor first arrives at the website, the browser posts a "presence" http request to the load balancer, sending presence information. The load balancer selects a presence server instance, and forwards the request to that presence server instance.

Where all presence server instances are using the same cache (primary Cache 1220), the presence server instance writes the presence information to the primary cache 1220 and returns its host name to the visitor. This becomes the assigned presence server instance for the visitor. The visitor (optionally) opens a websocket connection to the assigned presence server instance to listen for agent signals.

Where each presence server instance has its own instance cache 1230 in which visitor information is stored, rather than writing the presence information to the primary cache 1220, the presence server instance writes the visitor information to its associated instance cache 1230. In this implementation, the assigned presence server instance records the presence information in its own cache instance 1230. The selected presence server instance 1200 returns its host name to the visitor, and the visitor stores the assigned instance host name in local storage along with a timestamp.

A timestamp is included with each presence entry in the cache 1220, 1230. Presence information is set to automatically time out of the cache in 10 minutes if it is not updated, or upon expiration of another timeframe. In an implementation, the visitor may be configured to send a heartbeat, i.e. every 20 seconds, to keep any firewall associated with the visitor from dropping the connection due to perceived inactivity.

Likewise, the highlighted Co-browse button 420 (FIGS. 4-6) may dim with time, for example after 60 seconds, if the visitor is not active on the website. This prevents an agent from believing that a co-browse session is available where a visitor navigates away from a website and thus is not available to receive a message from the agent side, e.g. to start a session. In one implementation, the agent co-browse button may ping the visitor fairly frequently, i.e. every 5 seconds, to ensure that the visitor's browser window is still open and able to process agent-side commands, e.g. to start a co-browse session.

When the visitor navigates to a new page, ideally the visitor should open a new sockjs connection to the same instance it was connected to on the previous page. In one implementation, when the visitor navigates to a new page, the visitor posts a new presence http request to the load balancer. The load balancer 1210 allocates the request to any available presence server instance 1200. Whichever presence server instance handles the request, that presence server instance looks in the cache to see if there is already a presence server instance assignment for the visitor, and if the presence server instance is still running. The presence server instance that is handling the request writes the presence information provided by the visitor in the http request to the cache, and returns any existing presence server instance assignment (which may or may not be the same as the presence server instance currently handling the request) to the visitor. The visitor optionally opens a websocket connection to the presence server instance.

If a visitor tries to open a websocket connection to a presence server instance that is not responding, the visitor goes back to the load balancer to get a new presence server instance assignment.

If the presence server instances are using instance caches 1230 to store visitor information, rather than primary cache 1220, when the visitor navigates to a new page, the browser checks local storage for a presence server instance assignment. If the visitor has a presence server instance assignment that has not expired, the visitor will use it.

First, the visitor posts presence information to the load balancer, passing the assigned presence server instance host name. The load balancer forwards the visitor information to the presence server instance identified by the visitor, and the presence server instance stores the visitor information in the cache instance associated with the assigned presence server instance.

The visitor then (optionally) opens a sockjs connection to the assigned presence server instance. If the connection is successful, the visitor updates the timestamp on the presence server instance assignment in visitor local storage. If unable to connect, the visitor retries the presence request without a presence server instance assignment as on first arriving at the website, and will get a new presence server instance assignment to a new presence server instance.

If the visitor navigates to a different subdomain or protocol, the server assignment in local storage will not be accessible, and the visitor will get a new presence server instance assignment.

When an agent wishes to signal a visitor, the agent console (either via web service request from the co-browse server or via an ajax request from the agent browser) makes a "findvisitor" http request to the load balancer 1210, which forwards the request to any presence server instance 1200. The presence server instance looks up the visitor in the primary cache 1220 and returns the name of the assigned presence server instance handling the visitor to the agent. If the presence server instances are using multiple cache instances 1230, the presence server instance that receives the request will look up the visitor in each of the cache instances 1230. If the visitor appears in one cache instance, the ID of the presence server instance associated with that cache instance will be returned to the agent. If the visitor appears in multiple cache instances, the most recent one is assumed to be current. The assigned presence server instance associated with the most recent cache instance is returned to the agent.

The agent console then makes a "signalvisitor" request to the correct presence server instance, which sends the signal on the visitor's sockjs connection if it is currently open, or else queues the signal to be sent when the sockjs connection reconnects on navigate (this is where reliable stickiness is helpful).

If the agent wishes to monitor the activity of a visitor, the agent browser can use "findvisitor" to find the visitor's assigned presence server instance and then open a websocket connection to the assigned presence server instance. The agent will then be notified via messages on the websocket of interesting visitor side events such as visitor navigate (or custom events). Visitor stickiness is important for this to work well, since having all events associated with a given visitor forwarded to the same presence server instance enables the presence server instance to reliably forward these on the open connection to the agent.

If the agent side functionality is implemented server side, i.e. the agent handles presence via the co-browse service, websockets are not an option. Specifically, since the server is pulling the presence information, the browser at the agent won't automatically obtain updated presence information unless the agent page has some way to automatically refresh itself or if the data is manually refreshed. Accordingly, in this instance the agent will need to periodically poll the presence server instance to request updates.

An agent may also be interested in watching for a particular visitor who has not yet logged into the website. Ideally, this works by having the agent open a websocket connection to a presence server instance, then assign the visitor (upon arrival) to the same instance so that agent and visitor would end up both connected to the same presence server instance just as if visitor had connected first. If the agent side functionality is implemented server side, websockets are not an option and the agent will need to poll the presence system periodically instead.

If using a single primary cache 1220, allowing an agent to watch for particular users may be implemented by having the agent connect to any instance just as a visitor would, and the visitor to instance mapping is added to the primary cache 1220. If and when the visitor arrives, the visitor looks up his instance assignment as usual and will find one already in the cache.

If using instance caches 1230, there is no centralized location where all visitor assignments are stored. Hence, it becomes more complicated for the agent to be notified when a particular visitor arrives at the website. In one implementation, the agent may periodically poll the presence system using a findvisitor request until the visitor is detected. Once the visitor is detected the agent can open a websocket to monitor the visitor as described above. This option is possible where the agent console code is running in a browser or where the agent console code is running server side and the agent cannot open a websocket.

In another implementation, if the findvisitor request does not find the visitor on any instance, the server returns an arbitrary instance name, e.g. the name of the instance that handled the request. The server also adds a key (with say a 5 minute timeout) to all cache instances indicating that there is an agent interested in the visitor. The agent opens a websocket connection to the assigned presence server instance. When the visitor arrives and posts a presence request, the server checks to see if there is an interested agent, looking in any instance's cache. If there is an interested agent, the visitor will be assigned to that agent's presence server instance, and the agent will be notified via the websocket that the visitor has arrived.

An agent may also want to query for presence information about one visitor or about a set of visitors. In one implementation, the presence system supports this type of query via a lookupvisitor function. This function returns presence information for one visitor or a set of visitors depending on the implementation. Where a read-only node is associated with the cache, the read-only node could also be used to implement these queries. If multiple cache instances 1230 are being used the lookupvisitor function will query all cache instances 1230 to get the latest presence information for a visitor.

If a visitor arrives for the first time at a website at the exact same time an agent opens a websocket to detect visitor presence, the visitor and agent could end up connected to different instances. This is probably unlikely as there will be a very small window of time between reading the cache to check for an existing assignment, and writing the new assignment to the cache.

A more likely scenario where this may occur is when a presence server instance is scaled down. In this instance, any open sockjs/websocket connections are closed and the visitors will automatically go back to the load balancer for a new instance assignment. If a visitor and agent are already both connected to a presence server instance, then both will attempt to reconnect at the same time, potentially getting different presence server instance assignments. This is the same as the "visitor and agent connect at the same time" problem, but might be more probable since both sides have their connections closed simultaneously. When an instance is getting closed down it sends a close message on all connections. The close message could include a new instance assignment in this scenario, so that both sides reconnect to the same instance.

If the agent is trying to signal the visitor while the presence server instance handling the visitor is being scaled down, the agent's request to signal the visitor will fail since the presence server instance is inaccessible. The agent will need to repeat the findvisitor/signalvisitor sequence until the visitor is found on the newly assigned instance.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more non-transitory tangible computer-readable storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), cache, optical or magnetic disk, Redundant Array of Independent Disks (RAID), floppy drive, CD, DVD, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the Internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), tablet or handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Implementations of the systems and methods described above comprise computer components and computer-implemented steps that will be apparent to those skilled in the art. Furthermore, it should be understood by one of skill in the art that the computer-executable instructions may be executed on a variety of processors such as, for example, microprocessors, digital signal processors, gate arrays, etc. In addition, the instructions may be implemented in a high-level procedural and/or object-oriented programming language, and/or in assembly/machine language. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

The following reference numerals are used in the drawings:

10 first browser
12 first computer
14 second browser
16 second computer
18 co-browse session
20 co-browse service
22 web page
24 website
26 co-browse script
30 web page
32 co-browse session ID
34 presence system
36 CRM client
38 CRM record
400 CRM window
410 list of CRM records
412 account name
414 account type
416 annual sales
418 status
420 co-browse button
430 cursor
440 inset browser screen
800 tooltip containing list of visitor URLs
1100 presence access control system
1105 token
1110 agent
1120 presence system
1130 visitor
1200 presence server instance
1210 load balancer
1220 primary cache
1230 cache instances Although the methods and systems have been described relative to specific embodiments thereof, they are not so limited. Many modifications and variations may become apparent in light of the above teachings. Many additional changes in the details, materials, and arrangement of parts, herein described and illustrated, may be made by those skilled in the art. A number of implementations have been described. Nevertheless, it will be understood that additional modifications may be made without departing from the scope of the inventive concepts described herein, and, accordingly, other implementations are within the scope of the following claims.

What is claimed is:

1. A method of presence enhanced co-browsing customer support, comprising:
    downloading a webpage from a website to a visitor browser;
    downloading presence script and co-browse script to the visitor browser;
    posting presence information about the visitor browser by the presence script to a presence system;
    providing the presence information by the presence system to an agent system;
    sending an instruction, by the agent system to the presence system, to request that the presence system send a signal to the visitor browser to cause the visitor browser to start a co-browse session;
    in response to receipt of the instruction, sending the signal to the visitor browser, by the presence system, to activate the co-browse script in the visitor browser; and
    in response to receipt of the signal, initiating the co-browse session on a co-browse system, by the co-browse script in the visitor browser, on which the visitor browser's current live view of the website is viewable at the agent system.

2. The method of claim 1, wherein the agent system is a Customer Relationship Management (CRM) software system, the method further comprising using the information from the presence system to identify the visitor in the CRM software system.

3. The method of claim 1, further comprising the step of initiating a communication session between the agent and the visitor by the agent system in connection with the step of sending the instruction to the presence system.

4. The method of claim 3, wherein the communication session is a voice telephone call, a video telephone call, a communication session based on Voice Over Internet Protocol (VOIP), or a request for an interactive text or SMS based chat session.

5. The method of claim 1, further comprising:
    receiving, by the agent system, a request to participate in a communication session from the visitor; and
    accepting, by the agent system, the request to participate in the communication session;
    wherein the step of sending the instruction to the presence system is performed in connection with the step of accepting the request to participate in the communication session.

6. The method of claim 5, wherein the communication session is a voice telephone call, a video telephone call, a communication session based on Voice Over Internet Protocol (VOIP), or a request for an interactive text or SMS based chat session.

7. The method of claim 1, further comprising the step of displaying a dialog to the visitor via the visitor browser to request permission from the visitor in connection with the step of sending the signal the visitor browser and prior to initiating the co-browse session by the co-browse script.

8. The method of claim 1, further comprising the step of displaying a dialog to the visitor via the visitor browser to request permission from the visitor in connection with the step of sending the signal to the visitor browser, the dialog being downloaded from the co-browse system in connection with initiating the co-browse session.

9. The method of claim 1, wherein the step of sending the signal does not provide an indication in the visitor browser that the display of the visitor's current live view of the website will be viewable at the agent system.

10. The method of claim 1, wherein the co-browse script is configured to enable the co-browse session to be started by the visitor browser without action by the visitor.

11. The method of claim 1, wherein the presence information includes information to enable the presence system to uniquely identify the visitor.

12. The method of claim 11, wherein the presence information further includes a URL of the webpage that has been downloaded to the visitor browser.

13. The method of claim 11, wherein the presence information further includes a value of a shopping cart on the website associated with the visitor.

14. The method of claim 11, wherein the presence information further includes browsing history of other webpages on the website that have previously been downloaded to the visitor browser.

15. The method of claim 1,
    wherein the co-browse script contains instructions to post DOM information of the visitor browser to enable the visitor's current live view of the website to be recreated at the agent system.

16. The method of claim 11, wherein the presence information includes information entered by the visitor into the website.

17. The method of claim 11, wherein the presence information includes information that is obtained from a first party cookie stored by the browser containing information about the user gleaned from previous interactions between the visitor and the website.

18. A method of claim 1, further comprising:
    receiving, by the agent system, information about a plurality of visitors currently viewing the website from the presence system;
    using the information from the presence system to identify a subset of the visitors currently viewing the website that are known to the agent system; and
    displaying the identified subset of the known visitors via the agent system.

19. The method of claim 18,
    wherein the agent system is a Customer Relationship Management (CRM) software system, and
    wherein the step of using the information from the presence system comprises providing the information from the presence system to the CRM software system, and using the CRM software system to identify the subset of known visitors, wherein the subset of known visitors comprise visitors to the website that are recognized by the CRM software system.

20. The method of claim 19, wherein the step of displaying comprises displaying a list of CRM entries associated with visitors known in the CRM software system that are currently viewing the website.

21. The method of claim 19, wherein the step of displaying comprises highlighting CRM entries associated with visitors known in the CRM software system that are currently viewing the website.

22. The method of claim 19, further comprising displaying indications of content of webpages on the website that the visitors are currently viewing.

23. The method of claim 22, wherein the step of displaying indications is performed by hovering over the indications of the visitors known in the CRM software system via a user interface of the CRM software system.

24. The method of claim 22, further comprising displaying a list of previous web pages that one of the visitors, who is known in the CRM software system and currently viewing the website, has previously viewed.

25. The method of claim 18, further comprising displaying indications of content of webpages on the website that the visitors are currently viewing.

26. The method of claim 25, wherein the step of signaling only occurs upon interaction with one of the displayed indications.

27. The method of claim 25, wherein the step of displaying indications is performed by hovering over the indications of the visitors.

28. The method of claim 25, wherein the indications of content of webpages is a list of URLs of the webpages.

29. The method of claim 25, wherein the indications of content of webpages show current live views of the webpages obtained from co-browse sessions with the visitors.

30. The method of claim 25, further comprising displaying a list of previous web pages that one of the visitors, who is currently viewing the website, has previously viewed.

31. The method of claim 30, wherein the list of previous web pages is a list of URLs, list of page titles, list of product information contained on the previous web pages, or images of the previous web pages.

32. The method of claim 31, wherein the step of sending the instruction by the agent system to the presence system occurs for each of the identified subset of users, the method further comprising the step of displaying the current live view of the webpage of each of the identified subset of visitors by hovering over a URL of the current webpage in the list of URLs to enable the visitor's current live view of the website to be viewed at the agent system.

33. A non-transitory tangible computer readable storage medium having stored thereon a computer program for recreating content of a first browser at a second location, the computer program including a set of instructions which, when executed by a computer, cause the computer to perform a method comprising the steps of:
downloading a webpage from a website by the first browser;
downloading co-browse script and presence script from the website to the first browser;
forwarding, by the presence script, presence information identifying the first browser to a presence system;
receiving a signal from the presence system, by the presence script, to initiate a co-browse session; and
in response to receiving the signal, initiating a co-browse session, by the co-browse script on the first browser, the co-browse script being configured to capture HTML changes to the content of the first browser and forward the HTML changes via a co-browse service to the second browser, to enable the content of the first browser to be recreated at the second browser;
wherein the step of sending the signal does not require a person using the visitor browser to take any action in the visitor browser and does not provide an indication in the visitor browser that the display of the visitor's current live view of the website will be viewable at the agent system.

34. The method of claim 1, further comprising authenticating by the agent system to the presence system before the step of providing the presence information by the presence system to the agent system.

35. The non-transitory tangible computer readable storage medium of claim 33, wherein the presence information includes information to enable the presence system to uniquely identify the visitor.

36. The non-transitory tangible computer readable storage medium of claim 33, wherein the presence information further includes a URL of the webpage that has been downloaded to the visitor browser.

37. The non-transitory tangible computer readable storage medium of claim 33, wherein the presence information further includes a value of a shopping cart on the website associated with the visitor.

38. The non-transitory tangible computer readable storage medium of claim 33, wherein the presence information further includes browsing history of other webpages on the website that have previously been downloaded to the visitor browser.

39. The non-transitory tangible computer readable storage medium of claim 33, wherein the co-browse script contains instructions to post DOM information of the visitor browser to enable the visitor's current live view of the website to be recreated at the agent system.

40. The non-transitory tangible computer readable storage medium of claim 33, wherein the presence information includes information entered by the visitor into the website.

41. The non-transitory tangible computer readable storage medium of claim 33, wherein the presence information includes information that is obtained from a first party cookie stored by the browser containing information about the user gleaned from previous interactions between the visitor and the website.

42. A non-transitory tangible computer readable storage medium having stored thereon a computer program for recreating content of a first browser at a second location, the computer program including a set of instructions which, when executed by a computer, cause the computer to perform a method comprising the steps of:
downloading a webpage from a website by the first browser;
downloading co-browse script and presence script from the website to the first browser;
forwarding, by the presence script, presence information identifying the first browser to a presence system;
receiving a signal from the presence system, by the presence script, to initiate a co-browse session;
displaying a dialog to the visitor via the visitor browser to request permission from the visitor to initiate the co-browse session in response to receiving the signal from the presence system, the dialog being downloaded by the co-browse script from the co-browse system;
if the dialog receives input indicative of permission to start the co-browse session, initiating the co-browse session, by the co-browse script on the visitor browser, the co-browse script being configured to capture HTML changes to the content of the visitor browser and forward the HTML changes via the co-browse system to the agent system, to enable the content of the visitor browser to be recreated at the agent system; and
if the dialog does not receive input indicative of permission to start the co-browse session, not initiating the co-browse session.

* * * * *